(12) United States Patent
Inoue et al.

(10) Patent No.: US 10,846,323 B2
(45) Date of Patent: Nov. 24, 2020

(54) SEARCH SUPPORTING SYSTEM, SEARCH SUPPORTING METHOD AND SEARCH SUPPORTING PROGRAM

(71) Applicant: NIKON CORPORATION, Tokyo (JP)

(72) Inventors: Hideya Inoue, Yokohama (JP); Toru Iwaoka, Yotsukaido (JP); Michiko Noborisaka, Yokohama (JP); Masayuki Hatori, Soka (JP); Tomohide Hamada, Yokohama (JP); Yutaka Iwasaki, Yokohama (JP); Hideki Sasaki, Tokyo (JP)

(73) Assignee: NIKON CORPORATION, Tokyo (JP)

(*) Notice: Subject to any disclaimer, the term of this patent is extended or adjusted under 35 U.S.C. 154(b) by 31 days.

(21) Appl. No.: 15/901,110

(22) Filed: Feb. 21, 2018

(65) Prior Publication Data

US 2018/0181595 A1   Jun. 28, 2018

Related U.S. Application Data

(62) Division of application No. 13/629,338, filed on Sep. 27, 2012, now Pat. No. 9,934,251, which is a division
(Continued)

(30) Foreign Application Priority Data

Aug. 8, 2008   (JP) .................................. 2008-205730
Oct. 8, 2008   (JP) .................................. 2008-262035

(51) Int. Cl.
*G06Q 30/00*   (2012.01)
*G06F 16/583*   (2019.01)
(Continued)

(52) U.S. Cl.
CPC ........ *G06F 16/5838* (2019.01); *G06F 16/583* (2019.01); *G06Q 30/0282* (2013.01); *G06Q 30/06* (2013.01); *G06Q 30/0601* (2013.01)

(58) Field of Classification Search
CPC ... G06F 16/583; G06F 16/5838; G06Q 30/06; G06Q 30/0601; G06Q 30/0282
See application file for complete search history.

(56) References Cited

U.S. PATENT DOCUMENTS 5,570,127 A   10/1996 Schmidt
7,089,216 B2   8/2006 Van Overveld
(Continued)

FOREIGN PATENT DOCUMENTS

CN   1914611 A   2/2007
EP   1710717 A1   10/2006
(Continued)

OTHER PUBLICATIONS

Jul. 30, 2019 Office Action issued in European Patent Application No. 09804768.1.
(Continued)

*Primary Examiner* — Naeem U Haq
(74) *Attorney, Agent, or Firm* — Oliff PLC

(57) ABSTRACT

In a database, product image data is accumulated. A search portion acquires product image data having the image characteristics information that is the same as or similar to the image characteristics information that indicates the characteristics of the image of input image data from the database for the input image data. A search server outputs information on another product that is different from the product corresponding to the product image data together with the product image data acquired by the search portion.

6 Claims, 19 Drawing Sheets

Related U.S. Application Data of application No. 12/461,328, filed on Aug. 7, 2009, now Pat. No. 8,306,872.

(60) Provisional application No. 61/136,293, filed on Aug. 26, 2008.

(51) Int. Cl.
*G06Q 30/02* (2012.01)
*G06Q 30/06* (2012.01)

(56) References Cited

U.S. PATENT DOCUMENTS

| | | | |
|---|---|---|---|
| 7,228,283 | B1 | 6/2007 | Hornstein |
| 7,437,344 | B2 | 10/2008 | Peyrelevade |
| 7,450,759 | B2 | 11/2008 | Kudoh |
| 7,565,139 | B2 | 7/2009 | Neven, Sr. et al. |
| 7,627,502 | B2 | 12/2009 | Cheng et al. |
| 7,937,486 | B2 | 5/2011 | Ohsumi |
| 8,306,872 | B2 | 11/2012 | Inoue et al. |
| 10,540,757 | B1 * | 1/2020 | Bouhnik .......... G06T 5/50 |
| 2002/0069101 | A1 | 6/2002 | Vincent |
| 2004/0039592 | A1 | 2/2004 | Shima |
| 2006/0184648 | A1 | 8/2006 | Ohsumi |
| 2006/0253491 | A1 | 11/2006 | Gokturk et al. |
| 2007/0005571 | A1 | 1/2007 | Brewer et al. |
| 2007/0127042 | A1 | 6/2007 | Igarashi et al. |
| 2008/0082426 | A1 | 4/2008 | Gokturk et al. |
| 2008/0279481 | A1 | 11/2008 | Ando |
| 2009/0094260 | A1 | 4/2009 | Cheng et al. |
| 2009/0144173 | A1 | 6/2009 | Mo et al. |
| 2010/0076867 | A1 | 3/2010 | Inoue et al. |
| 2010/0250336 | A1 | 9/2010 | Selinger et al. |
| 2010/0325015 | A1 | 12/2010 | Westphal |
| 2011/0082735 | A1 | 4/2011 | Kannan et al. |
| 2013/0033591 | A1 * | 2/2013 | Takahashi .......... G06K 9/50 348/77 |
| 2017/0262991 | A1 * | 9/2017 | Davidson .......... G06T 11/001 |
| 2019/0244407 | A1 * | 8/2019 | Wiesel .......... G06K 9/00671 |
| 2020/0027151 | A1 * | 1/2020 | Jeong .......... G06F 16/538 |

FOREIGN PATENT DOCUMENTS

| | | |
|---|---|---|
| JP | H08-029358 A | 2/1996 |
| JP | 2001-22831 A | 1/2001 |
| JP | 2001-188860 A | 7/2001 |
| JP | 2001-229164 A | 8/2001 |
| JP | 2002099786 A | 4/2002 |
| JP | 2002-150138 A | 5/2002 |
| JP | 2002-216035 A | 8/2002 |
| JP | 2002-251547 A | 9/2002 |
| JP | 2003-091683 A | 3/2003 |
| JP | 2003-108593 A | 4/2003 |
| JP | 2003-122757 A | 4/2003 |
| JP | 2004-220200 A | 8/2004 |
| JP | 2004-246585 A | 9/2004 |
| JP | 2005-099891 A | 4/2005 |
| JP | 2006215867 A | 8/2006 |
| JP | 2006-318261 A | 11/2006 |
| JP | 2007115220 A | 5/2007 |
| JP | 2008-052672 A | 3/2008 |
| JP | 2008-176366 A | 7/2008 |

OTHER PUBLICATIONS

Zhang D., et al., "Study and evaluation of different Fourier methods for image retrieval", Image and Vision Computing, Elsevier, Guildford, GB, vol. 23, No. 1, Jan. 1, 2005 (Jan. 1, 2005 ), pp. 33-49, XP027617844, ISSN: 0262-8856 [retrieved on Jan. 1, 2005].
Jun. 5, 2018 Office Action issued in Japanese Patent Application No. 2017-038033.
Feb. 21, 2019 Summons to Attend Oral Proceedings issued in European Patent Application No. 09804768.1.
Jul. 18, 2016 Search Report issued in European Patent Application No. 09804768.1.
Sep. 13, 2016 Office Action issued in Japanese Application No. 2015-150705.
May 12, 2017 Office Action Issued in U.S. Appl. No. 13/629,338.
Dec. 14, 2012 Office Action issued in Chinese Patent Application No. 200980130948.6.
Jul. 23, 2013 Office Action issued in Chinese Patent Application No. 200980130948.6.
Bellman et al., "Predicators of Online Buying Behavior". Communication of the ACM, vol. 42, No. 12, pp. 32-38, 1999.
Sep. 8, 2009, Search Report issued in International Patent Application No. PCT/JP2009/003823.
Sep. 8, 2009, Written Opinion of the International Searching Authority issued in PCT/JP2009/003823.
Yang et al., "Contextseer: Context Search and Recommendation at Query Time for Shared Consumer Photos". ACM, 2008.
Smith et al., "Visualseek: A Fully Automated Content-Based Image Query System" ACM Multimedia, vol. 96, 1996.
Nov. 14 2011, Notice of Allowance issued in U.S. Appl. No. 12/461,328.
Jul. 14, 2011, Office Action issued in U.S. Appl. No. 12/461,328.
Dec. 27, 2010, Office Action issued in U.S. Appl. No. 12/461,328.
Jul. 9, 2013 Office Action issued in Japanese Patent Application No. 2010-523777.
Oct. 15, 2013 Office Action issued in Japanese Patent Application No. 2010-523777.
Jan. 6, 2015 Office Action issued in U.S. Appl. No. 13/629,338.
Aug. 13, 2015 Office Action issued in U.S. Appl. No. 13/629,338.
Aug. 2, 2018 Office Action issued in European Patent Application No. 09 804 768.1.
Dec. 3, 2019 Office Action issued in Japanese Patent Application No. 2018-223294.
Mar. 2, 2020 Search Report issued in European Patent Application No. 19202279.6.
Jun. 2, 2020 Office Action issued in Japanese Patent Application No. 2018-223294.

* cited by examiner

FIG. 2

| PRODUCT IDENTIFICATION INFORMATION | PRODUCT NAME | PRODUCT IMAGE DATA | CHARACTERISTICS INFORMATION | STORE INFORMATION | PRICE | COMBINATION INFORMATION | TYPE IDENTIFICATION INFORMATION |
|---|---|---|---|---|---|---|---|
| | | | | | | | |
| | | | | | | | |

FIG. 3

| USER IDENTIFICATION INFORMATION | PURCHASE INFORMATION | PREFERENCE INFORMATION | POINT INFORMATION |
|---|---|---|---|
|  |  |  |  |
|  |  |  |  |

FIG. 8

| IDENTIFICATION INFORMATION | ATTRIBUTE INFORMATION | | | | | | | |
|---|---|---|---|---|---|---|---|---|
| | SIMILAR PRODUCT ITEM | CHARACTERISTICS DATA (VECTOR) | | | | | PRICE (YEN) | BRAND (MAKER) |
| | | RD | GD | BD | SHAPE | TEXTURE | | |
| A1 | a1-1~a1-q | #121 | #122 | #123 | #a01 | #b01 | 13000 | SHAPI |
| A2 | a2-1~a2-k | #124 | #125 | #126 | #a02 | #b02 | 150000 | BAIN |
| A3 | a3-1~a3-r | #127 | #128 | #129 | #a03 | #b03 | 30000 | DOLL |
| ..... | | | | | | ... | | |
| An | an-1~an-m | #1n7 | #1n8 | #1n9 | #a0n | #b0n | 25000 | TAMA |

FIG. 9

| IDENTIFICATION INFORMATION | ATTRIBUTE INFORMATION | | | | | | | | |
|---|---|---|---|---|---|---|---|---|---|
| | SIMILAR PRODUCT ITEM | CHARACTERISTICS DATA (VECTOR) | | | | | | PRICE (YEN) | BRAND (MAKER) |
| | | RD | GD | BD | SHAPE | TEXTURE | | | |
| B1 | b1-1~b1-m | #221 | #222 | #223 | #c01 | #d01 | | 1000 | TOMMER |
| B2 | b2-1~b2-r | #224 | #225 | #226 | #c02 | #d02 | | 8000 | BIU |
| B3 | b3-1~b3-k | #227 | #228 | #229 | #c03 | #d03 | | 13000 | PANPY |
| ...... | | | | | | | | | |
| Bn | bn-1~bn-q | #2n7 | #2n8 | #2n9 | #c0n | #d0n | | 5000 | MCKEE |

FIG. 10

| IDENTIFICATION INFORMATION | ATTRIBUTE INFORMATION | | | | | | | |
|---|---|---|---|---|---|---|---|---|
| | SIMILAR PRODUCT ITEM | CHARACTERISTICS DATA (VECTOR) | | | | | PRICE (YEN) | BRAND (MAKER) |
| | | RD | GD | BD | SHAPE | TEXTURE | | |
| C1 | c1-1~c1-q | #321 | #322 | #323 | #e01 | #f01 | 7000 | GOO |
| C2 | c2-1~c2-k | #324 | #325 | #326 | #e02 | #f02 | 1900 | TASAKIYA |
| C3 | c3-1~c3-r | #327 | #328 | #329 | #e03 | #f03 | 13000 | BUMA |
| ... | | | | | | | | |
| Cn | cn-1~cn-m | #3n7 | #3n8 | #3n9 | #e0n | #f0n | 5000 | TORIICHI |

FIG. 11

| GROUP A1 | a1-1, a1-2, a1-3, ···, a1-m |
|---|---|
| GROUP A2 | a2-1, a2-2, a2-3, ···, a2-k |
| GROUP A3 | a3-1, a3-2, a3-3, ···, a3-l |
| ⋮ | |
| GROUP An | an-1, an-2, an-3, ···, an-q |

FIG. 12

| GROUP B1 | b1-1, b1-2, b1-3, ···, b1-k |
|---|---|
| GROUP B2 | b2-1, b2-2, b2-3, ···, b2-l |
| GROUP B3 | b3-1, b3-2, b3-3, ···, b3-q |
| ⋮ | |
| GROUP Bn | bn-1, bn-2, bn-3, ···, bn-m |

FIG. 13

| GROUP C1 | c1-1, c1-2, c1-3, ···, c1-m |
|---|---|
| GROUP C2 | c2-1, c2-2, c2-3, ···, c2-k |
| GROUP C3 | c3-1, c3-2, c3-3, ···, c3-l |
| ⋮ | |
| GROUP Cn | cn-1, cn-2, cn-3, ···, cn-q |

FIG. 14

| CATEGORY 1 (SHIRT) | CATEGORY 2 (PANTS) | CATEGORY 3 (JACKET) |
|---|---|---|
| a1-1 | b1-2 | c1-7 |
| a1-2 | b2-3 | c1-5 |
| a1-3 | b1-4 | c1-m |
| ⋮ | ⋮ | ⋮ |
| a1-m | b1-k | c1-6 |

FIG. 15

| IDENTIFICATION INFORMATION \ ATTRIBUTE INFORMATION | SIMILAR PRODUCT ITEM | CHARACTERISTICS DATA (VECTOR) | | | | | PRICE (YEN) | BRAND (MAKER) |
|---|---|---|---|---|---|---|---|---|
| | | RD | GD | BD | SHAPE | TEXTURE | | |
| a1-1 | A1 | #191 | #192 | #193 | #a81 | #b801 | 2000 | TOTERSY |
| a1-2 | A1 | #194 | #195 | #196 | #a82 | #b82 | 50000 | BANI |
| a1-3 | A1 | #197 | #198 | #199 | #a03 | #b83 | 3500 | DOMARL |
| ..... | | | | | | | | |
| a2-1 | A2 | #191 | #192 | #193 | #a81 | #b801 | 2000 | TOTERSY |
| a2-2 | A2 | #194 | #195 | #196 | #a82 | #b82 | 50000 | BANI |
| a2-3 | A2 | #197 | #198 | #199 | #a03 | #b83 | 3500 | DOMARL |
| ..... | | | | | | | | |
| an-m | An | #1m7 | #1m8 | #1m9 | #a8n | #b8m | 85000 | TOSHIMA |

FIG. 16

| IDENTIFICATION INFORMATION / ATTRIBUTE INFORMATION | SIMILAR PRODUCT ITEM | CHARACTERISTICS DATA (VECTOR) | | | | | | PRICE (YEN) | BRAND (MAKER) |
|---|---|---|---|---|---|---|---|---|---|
| | | RD | GD | BD | SHAPE | TEXTURE | | | |
| b1-1 | B1 | #191 | #192 | #193 | #c81 | #b801 | | 2000 | TOTERSY |
| b1-2 | B1 | #194 | #195 | #196 | #c82 | #b82 | | 50000 | BANI |
| b1-3 | B1 | #197 | #198 | #199 | #c03 | #b83 | | 3500 | DOMARL |
| ...... | | | | | | | | | |
| b2-1 | B2 | #191 | #192 | #193 | #c81 | #b801 | | 2000 | TOTERSY |
| b2-2 | B2 | #194 | #195 | #196 | #c82 | #b82 | | 50000 | BANI |
| b2-3 | B2 | #197 | #198 | #199 | #c03 | #b83 | | 3500 | DOMARL |
| ...... | | | | | | | | | |
| bn-m | Bn | #1m7 | #1m8 | #1m9 | #a8m | #b8m | | 85000 | TOSHIMA |

FIG. 17

| ATTRIBUTE INFORMATION / IDENTIFICATION INFORMATION | SIMILAR PRODUCT ITEM | CHARACTERISTICS DATA (VECTOR) ||||| PRICE (YEN) | BRAND (MAKER) |
|---|---|---|---|---|---|---|---|---|
| | | RD | GD | BD | SHAPE | TEXTURE | | |
| c1-1 | C1 | #891 | #892 | #893 | #e81 | #f801 | 6000 | TOTERSY |
| c1-2 | C1 | #894 | #895 | #896 | #e82 | #f82 | 80000 | BANI |
| c1-3 | C1 | #897 | #898 | #899 | #e03 | #f83 | 13500 | DOMARL |
| c2-1 | C2 | #811 | #892 | #893 | #e81 | #f801 | 12000 | TOTERSY |
| c2-2 | C2 | #894 | #895 | #896 | #e82 | #f82 | 90000 | BANI |
| c2-3 | C2 | #897 | #898 | #899 | #e03 | #f83 | 23500 | DOMARL |
| cn-m | Cn | #8m7 | #8m8 | #8m9 | #e8m | #f8m | 125000 | TOSHIMA |

FIG. 19

| USER IDENTIFICATION INFORMATION | NAME | MAIL ADDRESS |
|---|---|---|
| U-1245 | ○○ | ○@xxx.com |
| U-1489 | □□ | □@xxx.com |
| U-3265 | ▽△ | ▽@xxx.com |

| USER IDENTIFICATION INFORMATION | | | |
|---|---|---|---|
| ACCESS DATE | IDENTIFICATION INFORMATION OF PURCHASED PRODUCT | IDENTIFICATION INFORMATION OF PRODUCT ITEM THAT HAS BEEN FOUND BUT NOT BEEN PURCHASED | IDENTIFICATION INFORMATION OF PRODUCT ITEM THAT HAS BEEN RECOMMEND BUT NOT BEEN PURCHASED |
| 200X/07/14 | A2 | — | B2 |
| 200X/09/22 | B3, A5 | — | — |
| 200Y/01/07 | — | C2 | — |
| ... | | | |

# SEARCH SUPPORTING SYSTEM, SEARCH SUPPORTING METHOD AND SEARCH SUPPORTING PROGRAM

This application is a divisional of U.S. patent application Ser. No. 13/629,338 filed Sep. 27, 2012, which in turn is a divisional of U.S. patent application Ser. No. 12/461,328 filed Aug. 7, 2009, is a non-provisional application claiming priority to and the benefit of U.S. provisional application No. 61/136,293, filed Aug. 26, 2008, and claims priority to Japanese Patent Application No. 2008-205730 filed on Aug. 8, 2008 and Japanese Patent Application No. 2008-262035 filed on Oct. 8, 2008. The entire contents of which are incorporated herein by reference.

BACKGROUND

Field of the Invention

The present invention relates to a search supporting system, a search supporting method, and a search supporting program that support a user to search a target through the Internet and to select or determine a target.

Related Art

Conventionally, systems that support selection or determination of a target to be searched by a user have been used when the user searches for the target (for example, a product or the like) through a network such as the Internet and purchases the target (for example, see Japanese Patent Application Publication No. 2004-246585A).

For example, a user searches for a target by inputting the name (for example, a product name or the like) of the target or the characteristics of the target by using various search engines available on the Internet. In addition, as needed, the user searches for a store that sells the above-described target.

Then, a server device having the above-described search engine supports the user's search for the target by presenting the image of a target corresponding to the user's preference or the price thereof included in the found store to the user's terminal through the Internet or providing a related target or the like.

In addition, recently, the purchase of products from a virtual store from a virtual mall on the Internet without visiting a retail store that provides face-to-face sales for purchasing the product has increased.

As a result, even in a region in which a large-size retail store is not located nearby, it becomes possible for a user to purchase a product of choice from among a plurality of products of many types while being seated in his or her house (for example, see Japanese Patent Application Publication No. 2002-150138A).

However, in the above-described conventional examples and the like, when the user searches for the target, the user inputs text data representing the name or the like of the target or selects the target from images of targets that have been prepared in advance for a search. Accordingly, when the user has information on the image of the target only and does not know the name of the target, there is a problem that the user cannot search the target actually desired to be searched or a target that is similar to the search target.

A purpose of some aspects of the present invention is to provide a search supporting system, a search supporting method, and a search supporting program that are capable of searching for a target desired to be searched by the user by using the image data of the target, for example, even in a case where the name of the target is not known to the user.

SUMMARY

According to an aspect of the invention, a search supporting system is provided, the system including: a database in which product image data is accumulated; and a search portion that acquires the product image data having image characteristics information that is the same as or similar to the image characteristics information representing the characteristics of an image of input image data for the input image data from the database, wherein information on another product that is different from a product corresponding to product image data is output together with the product image data that is acquired by the search portion.

According to another aspect of the invention, a method of supporting a search is provided, the method including: a search process for acquiring product image data having image characteristics information that is the same as or similar to the image characteristics information that represents the characteristics of an image of input image data for the input image data from a database; and a process for outputting information on another product that is different from a product corresponding to the product image data together with the product image data that is acquired by the search process.

According to another aspect of the invention, there is provided a search supporting program that is a computer-executable search supporting program that allows a computer to perform the operations of: a search process for acquiring product image data having image characteristics information that is the same as or similar to the image characteristics information that represents the characteristics of an image of input image data for the input image data from a database; and a process for outputting information on another product that is different from a product corresponding to the product image data together with the product image data that is acquired by the search process.

According to another aspect of the invention, a search supporting system is provided, the system including: a database in which target image data for a target searched by a user is accumulated; an extraction portion that extracts a searching portion of input image data that has been input; a search portion that acquires the target image data that coincides with or has high similarity to image data of the searching portion from the target image data from the database by comparing image characteristics information that represents the characteristics of an image of the image data of the searching portion with image characteristics information that represents the characteristics of an image of the target image data that is included in the database.

According to another aspect of the invention, a method of supporting a search is provided, the method including: an extraction process for extracting a searching portion of a target from input image data that has been input; and a search process for extracting the target image data that coincides with or is highly similar to the image data within the searching portion by comparing the image data within the searching portion and the target image data that is accumulated in the database from the database.

According to another aspect of the invention, there is provided a search supporting program that is a computer-executable search supporting program that allows a computer to perform the operations of: an extraction process for extracting a searching portion of a target from input image data that has been input; and a search process for extracting the target image data that coincides with or is highly similar to the image data within the searching portion by comparing the image data within the searching portion and the target image data that is accumulated in the database from the database.

According to another aspect of the invention, a search supporting system is provided, the system including: a combined product database in which attribute information of product items acquired form an image medium is accumulated for each same category; a combination information database in which, for each of the product items, combination information with another product item of a different category that is used in combination with the each of the product items is stored; a product item database in which attribute information of product items that are sold is stored; a similar-item searching portion that selects the image data of a product input by a user and a candidate group of the product items of which attribute information is the same as or similar to that of the image data from the combined product database; a combination searching portion that, in correspondence with each of the product items of the candidate group, searches for other product items that are combined with the each of the product items from the combination information database; and a product-item searching portion that searches for image data of a product item that is the same as or similar to the image data of the another product item of the combination that is selected by the user from combinations of the product item and the another product item from the product item database based on the attribute information of the image data and outputs the image data of the another product item as a recommended product.

According to another aspect of the invention, a method of supporting a product search is provided, the method including: a similar-item searching process for selecting a candidate group of product items that are the same as or similar to image data of a product input by a user and attribute information of the image data from a combined product database in which the attribute information of the product items acquired from an image medium are accumulated for each same category; a combination searching process for searching for another product item that is combined with the product item in association with each product item of the candidate group from a combination information database in which combination information between each product item and another product item of a different category that is used in combination with the each product item is stored for the each product item; and a product item searching process for searching for the product item that is the same as or similar to the image data of the another product item of the combination that is selected by the user from the combinations between the product item and the another product item based on the attribute information of the image data of the another product item and the image data from a product item database in which the attribute information of the product items is accumulated and outputs the product item as a recommend product.

According to another aspect of the invention, there is provided a search supporting program that is a computer-executable search supporting program that allows a computer to perform the operations of: a similar-item searching process for selecting a candidate group of product items that are the same as or similar to image data of a product input by a user and attribute information of the image data from a combined product database in which the attribute information of the product items acquired from an image medium are accumulated for each same category; a combination searching process for searching for another product item that is combined with the product item in association with each product item of the candidate group from a combination information database in which combination information between each product item and another product item of a different category that is used in combination with the each product item is stored for the each product item; and a product item searching process for searching for the product item that is the same as or similar to the image data of the another product item of the combination that is selected by the user from the combinations between the product item and the another product item based on the attribute information of the image data of the another product item and the image data from a product item database in which the attribute information of the product items is accumulated and outputs the product item as a recommend product.

According to some aspects of the present invention, a target desired to be searched by a user or a target similar to the above-described target can be searched in an easy manner.

BRIEF DESCRIPTION OF THE DRAWINGS

FIG. 2 is a conceptual diagram representing an example of the configuration of a product table that is stored in a database 16 represented in FIG. 1.

FIG. 3 is a conceptual diagram representing an example of the configuration a user registration table that is stored in the database 16 represented in FIG. 1.

FIG. 8 is a table in which attribute information of a combination product item of Category 1 (shirts) in a product item database 26 represented in FIG. 7.

FIG. 9 is a table in which attribute information of a combination product item of Category 2 (pants) in the product item database 26 represented in FIG. 7.

FIG. 10 is a table in which attribute information of a combination product item of Category 3 (jacket) in the product item database 26 represented in FIG. 7.

FIG. 11 is a table representing correspondence between a product item of Category 1 that is sold and a combined product item of Category 1 that is collected from an image medium similar to the product item.

FIG. 12 is a table representing correspondence between a product item of Category 2 that is sold and a combined product item of Category 2 that is collected from an image medium similar thereto.

FIG. 13 is a table representing correspondence between a product item of Category 3 that is sold and a combined product item of Category 3 that is collected from an image medium similar thereto.

FIG. 14 is a table representing a combination between categories of the combined product items collected form an image medium in a combination information database 28 of FIG. 7.

FIG. 15 is a table in which attribute information of a combined product item of Category 1 (shirt) of the combined product image information database 29 of FIG. 7.

FIG. 16 is a table in which attribute information of a combined product item of Category 2 (pants) of the combined product image information database 29 of FIG. 7.

FIG. 17 is a table in which attribute information of a combined product item of Category 3 (jacket) of the combined product image information database 29 of FIG. 7.

FIG. 19 is a conceptual diagram representing the configuration of a user table of a history database 31 of FIG. 7.

FIG. 20 is a conceptual diagram representing the configuration of a purchase history table of the history database 31 of FIG. 7.

DESCRIPTION OF EMBODIMENTS

First Embodiment

Figure 1:
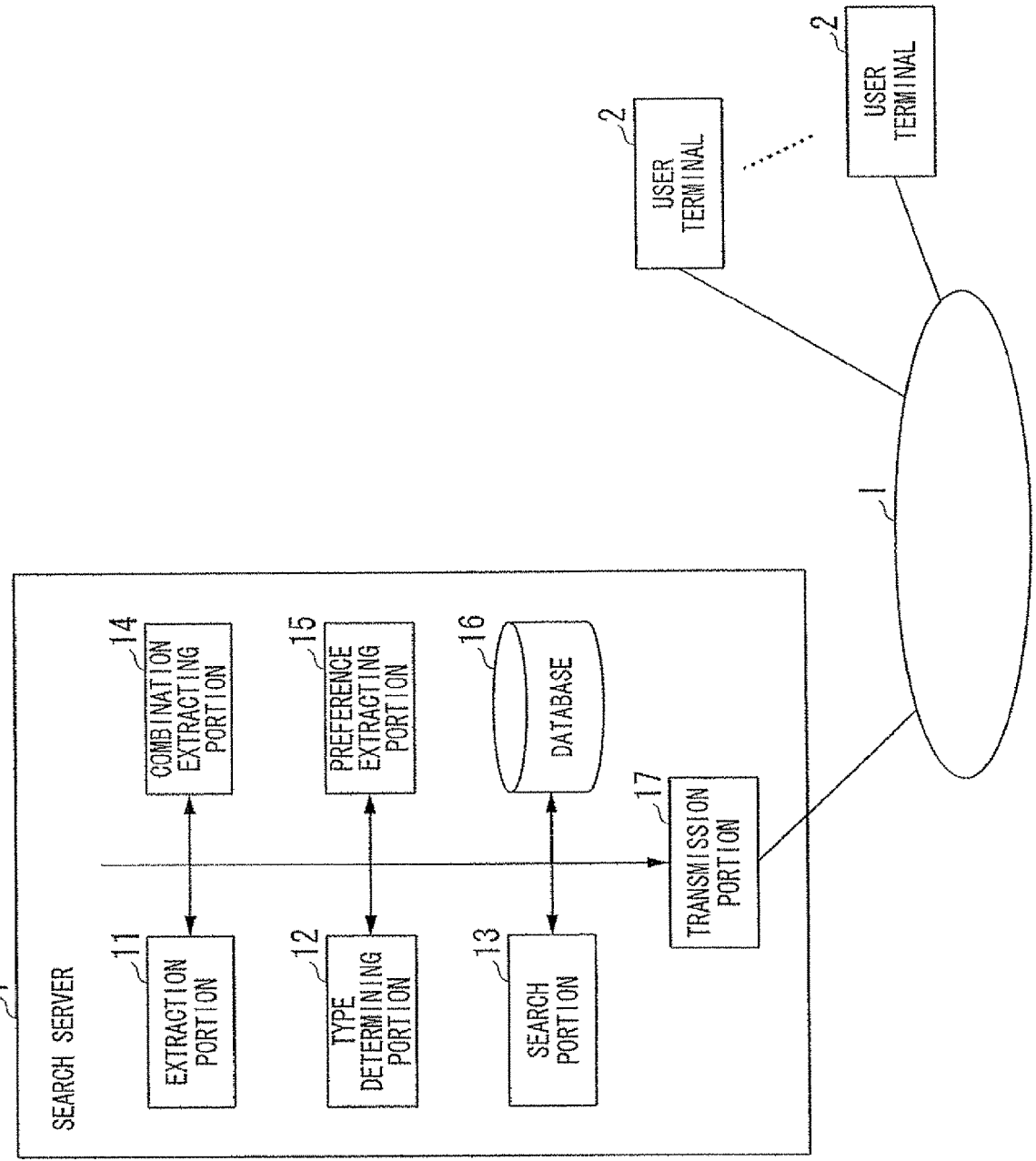
FIG. 1 is a block diagram representing an example of the configuration of a search supporting system according to an embodiment of the present invention.

Hereinafter, a search supporting system according to an embodiment of the present invention will be described with reference to drawings. FIG. 1 is a block diagram representing an example of the configuration of the search supporting system according to the embodiment.

In the figure, the search supporting system includes a search server 1 and a user terminal 2 connected to the search server 1 through an information communication network I configured by the Internet or the like.

Here, the user terminal 2 is a terminal that is used by a user and is identified by user identification information that is unique to each user.

Hereinafter, in this embodiment, a case where a user searches for a product such as a fashion product, clothes, shoes, a necklace, or a hat as a desired search target and purchases the product will be described as an example. In addition, this embodiment is not limited to the case of a product such as a fashion product, clothes, shoes, a necklace, or a hat and can be applied to the case of a target such as an electronic product, furniture, or a painting that can be searched for through the Internet or a network. Furthermore, examples of the target according to this embodiment are a commercial product, goods, an electronic product, furniture, a painting, a building that includes a store or a company, a plant, an animal, real estate (includes the exterior, the interior, the arrangement of rooms, or the like of a mansion), a landscape, and the like.

The search server 1 is a server that supports a user's search for a product in a store on the internet or the like and includes an extraction portion 11, a type determining portion 12, a search portion 13, a combination extracting portion 14, a preference extracting portion 15, a database 16, and a transmission portion 17.

In the database 16, as shown in FIG. 2, a product table in which, in association with product identification information for indentifying each product, the name of a product, product image data (target image data) that is image data of the product, characteristics information that is extracted from the product image data, store information in which the product is sold, the price of the product, combination information of other products combined with the product, and type identification information that represents the type (a product genre such as clothes, shoes, a hat, or a necklace) are associated with one another is stored. In this database 16, for example, product information of stores that are registered in the search supporting system as members is sequentially accumulated. The above-described characteristics information is formed by representing elements such as a color, a form, a shape, and a texture as numeric data (for example a vector of the order corresponding to the number of the elements). When images are directly compared to each other based on the image of a product desired to be searched by the user and the product image (target image) that is accumulated in the database 16, the type determining portion 12 may be omitted.

The extraction portion 11 extracts a search portion from the input image data by receiving image data (the image data provided by the user), which is transmitted from the user terminal 2 by the user, through the transmission portion 17. Described in more details, the extraction portion 11 extracts the contour (search portion) of the image area of a product from the input image data and generates contour image data (the image data of the search portion). Here, in the process of extracting the contour image data, a contour is a portion in which the density value of the image is abruptly changed. In order to extract the contour, a differential operation is performed. However, for a digital image, data is aligned at a constant interval in a discontinuous manner, and accordingly, as an operation (difference) for taking a difference between adjacent pixels, the differential is approximated, and a portion in which the density of the pixel is abruptly changed is extracted as a contour.

The type determining portion 12 searches for template image data corresponding to template image data from the template image data in the product contour data table that is stored in the database 16 in advance by using the above-described contour image data and reads in the type identification information that is set in correspondence with the template image data in the database 16. It is preferable that this template image data be stored as templates to be compared with the contour included in the contour data table of the database 16 in advance by photographing a plurality of products for each type from a plurality of angles.

The search portion 13 extracts the characteristics of the search image data acquired by performing contour extraction for the input image data from a memory area of the type corresponding to the above-described type identification information and searches for characteristics information that coincides with the acquired characteristics information or has high similarity to the acquired characteristics information from the image data that has the type identification information corresponding to the determined type in the product table of the database 16, and extracts the image data of products having high similarity, the number of which is a value set in advance, in the descending order of the similarity. Here, in a case where the type determining portion 12 is not provided, the search portion 13 compares the image of the product of which the contour is extracted from the input image data with the product image data included in the whole product table and extracts product image data having high similarity to the image of the product for which the contour extraction has been performed.

In addition, the search portion 13 transmits the product information (target information) corresponding to the searching product image data to the user terminal 2 used by the user. In addition, the above-described product information is information that includes at least one of the name (product name), the sales store that sells the product corresponding to the product image data, the URL of the sales store, the telephone number or the address of the sales store, and the price of the product.

The preference extracting portion 15 extracts image data of other products (products of the same type as that of the product searched by the user) included in the type of the product that has been searched by the user, the number of which is randomly set in advance, from the product table and transmits the image data to the user terminal 2.

The user terminal 2 displays the image data that is transmitted from the search server 1 on a display screen not shown in the figure.

In addition, the preference extracting portion 15 writes preference information, which includes at least one of the form, the color, the shape, and the texture for each user into a user registration table of the database 16 that is represented in FIG. 3 for record by inputting the result of determination on likes or dislikes for each product (for example, the product image data stored in the database 16) that is transmitted from the user terminal 2.

Here, in the user registration table, purchase information (including the purchased product identification information, purchased date and time, the store at which the product is purchased, the purchase price, and the like) that indicates products that were purchased in the past, the preference information that is extracted by the preference extracting portion 15, and point information that represents the number of points owned by the user are stored in association with the user identification information. These points can be used like cash at the time of paying for a purchased product.

In other words, in a case where discount coupon information is added to the above-described store information and the user purchases a found product by using the discount coupon information, the search server 1 stores the purchase information on the product in the above-described user registration table of the database 16. Then, the search server 1 adds points corresponding to the price of the purchased product to the corresponding user included in the user registration table as the number of points of the above-described point information. The preference extracting portion 15 may be configured to extract the preference information for each type from the above-described purchase information.

The combination extracting portion 14 transmits products of other types that may be purchased in combination with the extracted product at high possibility to the user's terminal by searching in advance for products corresponding to the combination information that is stored in association with the preference information.

Figure 4:
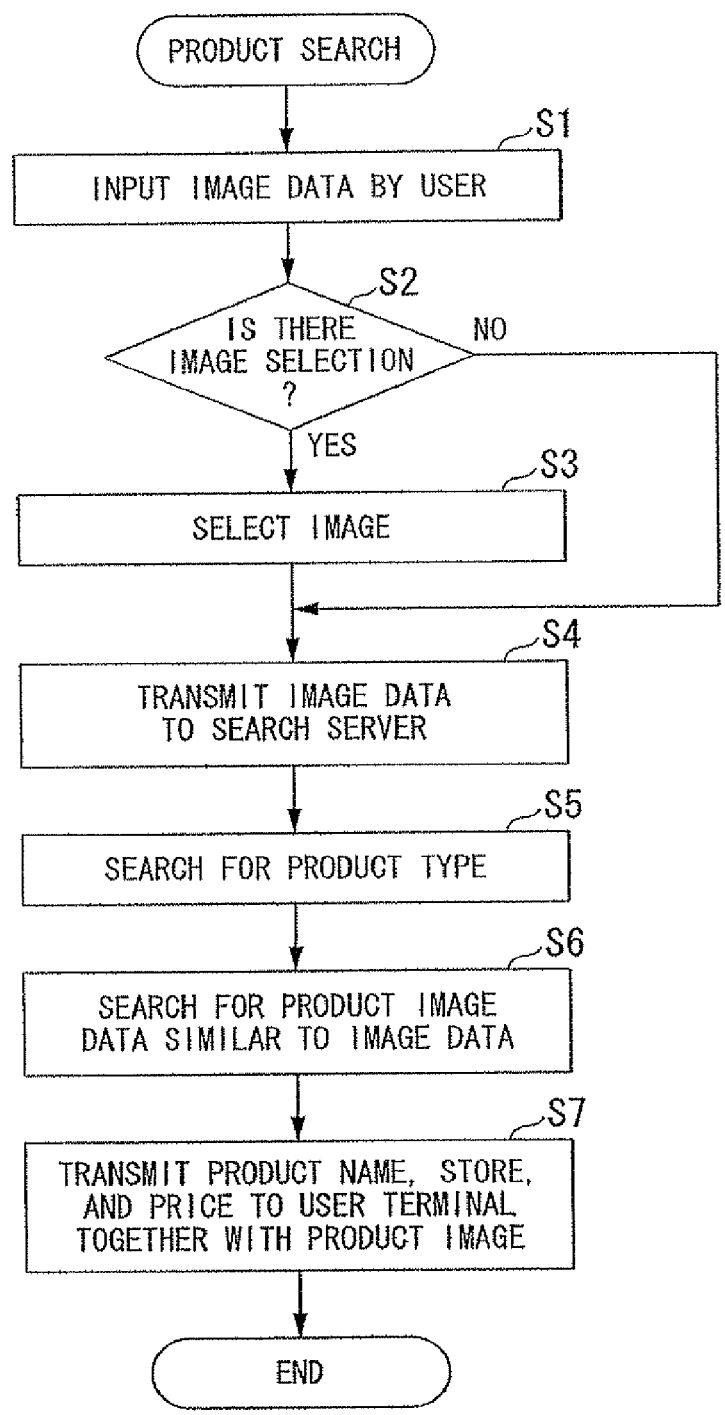
FIG. 4 is a flowchart representing an example of the operation of product searching in a search supporting system according to the embodiment.

Next, the operation of the search supporting system according to this embodiment will be described with reference to FIGS. 1 and 4. FIG. 4 is a flowchart for describing an example of the operation of the search supporting system according to this embodiment. In descriptions below, a case where the type determining portion 12 is provided will be described. When the type determining portion 12 is not provided, the process of the type determining portion 12 is omitted from the flowchart.

A user reads out the image of a model wearing a favorite clothing from a magazine or the like by using a color scanner or the like that is connected to the user terminal 2, performs photographing by using a digital camera, or downloads an image from the Internet (Step S1).

Then, the user inputs the read-out image, the photographed image, or the downloaded image to the user terminal 2 as input image data and determines whether to select an area of the image of a product desired to be searched for based on whether there is a plurality of types of products in the input image data (Step S2). In addition, the input image data may be stored in the user terminal 2 in advance or may be stored in an external terminal.

At this moment, for example, when the product name of a skirt and a store selling the skirt are to be searched for, in a case where only the skirt shows up in the input image data, the process proceeds to Step S4.

On the other hand, when the entire model, not only the image of the skirt portion, is photographed, the process proceeds to Step S3.

Then, the user selects an image by marking the image of the skirt area portion with a line or the like by using an image processing tool (any tool that can be used for performing a process of drawing a line in the input image data) that is installed to the user terminal 2 (Step S3), and the process proceeds to Step S4.

The user terminal 2 transmits the input image data (including data for which image selection has been performed) input by the user together with its user identification information to the search server 1 through the information communication network I as a search request signal (Step S4).

In addition, in the above-described Step S2, it may be configured that the search server 1 determines whether there is a plurality of types of products in the input image data received from the user terminal 2 and transmits the determined type to the user terminal 2. In this case, in Step S3, image selection is performed for the type desired to be searched for from among the types included in the input image data received from the search server 1, and the process proceeds to Step S4.

Next, when receiving the above-described search request signal from the user terminal 2, the search server 1 outputs the above-described input image data to the extraction portion 11.

The extraction portion 11 performs contour extraction (extraction of the search portion) for the product image included in the input image data that has been input.

At this moment, when any area included in the input image data is not marked, the extraction portion 11 extracts contour image data of the entire input image data. On the other hand, when there is an area portion that has been marked, the extraction portion 11 extracts the contour image data of the image of the marked area portion.

Then, the type determining portion 12 searches for template image data corresponding to the contour image data from the contour data table corresponding to the type of the product stored in the database 16 in advance by using the above-described contour image data and reads in the type identification information corresponding to the template image data from the contour data table (Step S5).

The search portion 13 extracts the characteristics of the image data (search image data) to be searched for, which is included in the input image data, in association with the contour inner portion of the above-described contour image data and searches for the product image data similar to the characteristics information (for example, information on the basis of the color or the form) of the search image data from the product table of the database 16 (Step S6).

At this moment, the search portion 13 requests for vector distances among elements (for example, in a case where the characteristics information is information on the basis of the color, blue, red, yellow, and the like) of the characteristics information and calculates the similarity indicating whether the distances coincide with each other or the distance is short or long. It is assumed that the similarity is high for a case where the distance is short.

In addition, the search portion 13 extracts products, the number of which is a value set in advance, in the descending order of the similarity from the product table.

Next, the search portion 13 transmits product information (information that includes at least one of the product name, the price of the product, the store selling the product image data, the URL, the telephone number and the address of the store) corresponding to the found product image data to the user terminal 2 that is used by the user through the transmission portion 17 (Step S7). Here, as an example, the transmission portion 17 reads out the address of the user terminal 2 on the network, which is added at the time of transmission of the search request signal from the user terminal 2, and transmits the above-described product information to this address.

Then, the user terminal 2 displays the information on the product name, the image data, the store, and the price as the search result that has been transmitted from the product sales searching server 1 on the display screen.

In addition, in the above-described Step S5, in the user registration table of the database 16, the search server 1 may be configured to extract the product image data of the search target from the database 16 based on the input image data that is included in the search request signal only in a case where registration of the user identification information, which is included in the search request signal, in the user registration table is detected. In addition, when detecting that the user identification information included in the search request signal is not registered in the user registration table, for example, the search server 1 transmits information to the user terminal 2 indicating that the user registration on the basis of the user identification information is needed.

Accordingly, the user can acquire information on the product name of a favorite product or a product similar to the favorite product, store information that indicates the store that sells the product, the price of the product, and the like by transmitting the image data.

Here, in a case where discount coupon information is added to the store information, and the found product is purchased by using the discount coupon information, the product sales searching server 1 charges an amount corresponding to the price of the product to the target store.

Figure 5:
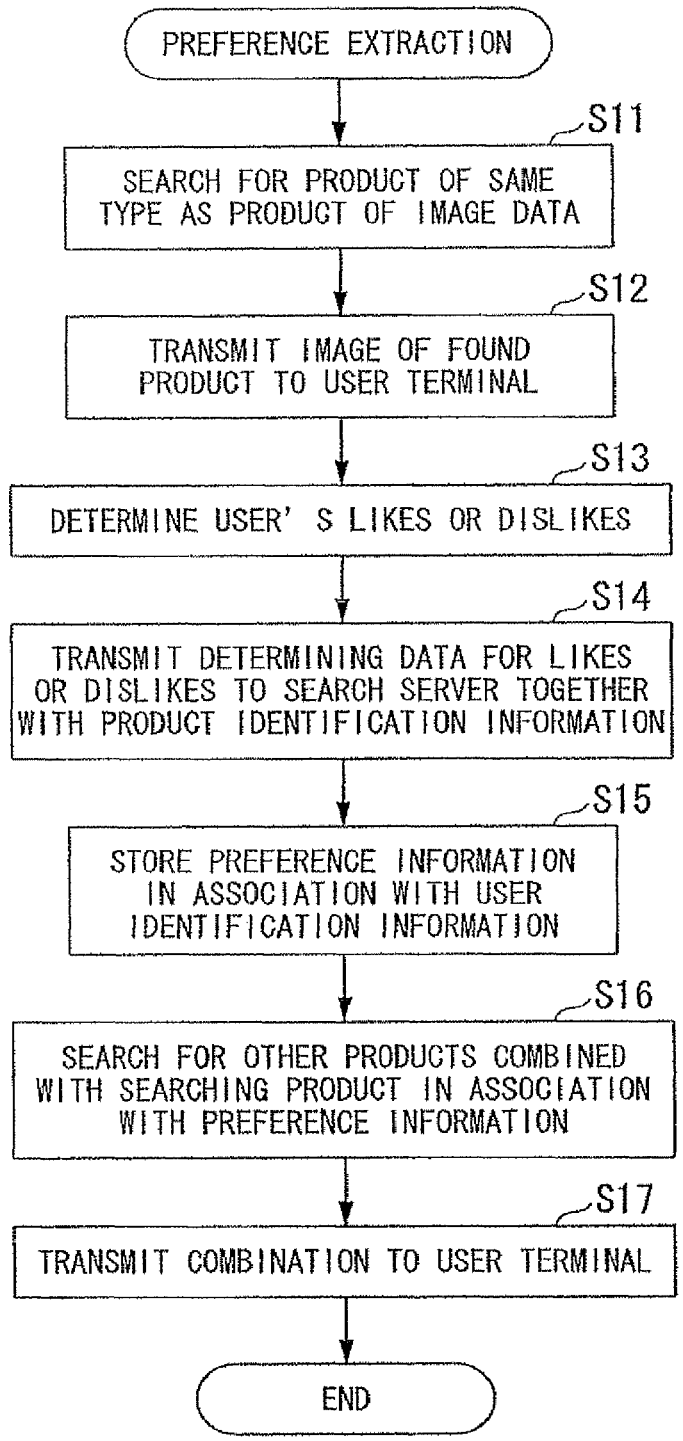
FIG. 5 is a flowchart representing an example of the operation of preference information collecting in a search supporting system according to the embodiment.

Next, a process for extracting the user's preference information and suggesting other products that can be combined together with the above-described found product based on the preference information by using the search server 1 according to this embodiment will be described with reference to FIGS. 1 and 5. FIG. 5 is a flowchart for describing an example of the operation for introducing other products based on the preference information by collecting the user's preference information.

The preference extracting portion 15 extracts products of the same type as that of the user's searching product, for example, shoes for a case where the user's searching products are shoes, the number of which is a value set in the product table in advance (Step S11), and transmits the product image data and the product identification information (Step S12). At this moment, the products for each type to be transmitted to the user are odd products that are different from one another in the color, the form, the shape, and the like and are configured as products from which a fashion coordinator can extract the user's preference information.

Then, when receiving the product image data of the products for extracting the preference from the search server 1, the user terminal 2 sequentially displays the product image data (product images) of the products on the display screen.

At this moment, in the display image displayed on the above-described display screen, when the user likes the product of the displayed product image data, the user clicks on the "positive button" by using input means such as a mouse. On the other hand, when the user does not like the product of the displayed product image data, the user clicks on the "negative button" by using the input means such as a mouse. (Step S13).

When the "positive button" or the "negative button" is selected, the user terminal 2 displays the product image data of the next product on the display screen, and this process is continued until the user's positive or negative selection for all the received product image data or the received product image data corresponding to a predetermined number is completed.

When the above-described positive or negative determination for the above-described product image data is completed, the user terminal 2 transmits the search server 1 the determination result information in which the positive or negative determination result for the product is associated with each product identification information with its user identification information added thereto (Step S14).

When receiving the determination result information as input, the transmission unit 17 determines whether the added user identification information is registered in the user registration table. When the added user identification information is registered in the user registration table, the transmission unit 17 outputs the above-described determination result information to the preference extracting portion 15.

Next, when receiving the determination result information as input, the preference extracting portion 15 selects preference information corresponding to the positive and negative determination pattern from the preference information table of the database 16.

Here, the positive and negative determination pattern is a pattern of positive determination and negative determination corresponding to the product identification information that is arranged in the order set in advance.

Then, the preference extracting portion 15 writes the acquired preference information in the user registration table of the database 16 in association with the user identification information (Step S15).

Next, the combination extracting portion 14 selects combination information of the products corresponding to the above-described preference information from the combination information table of the database 16. In this combination information table, for example, in a case where the preference information is extracted with respect to shoes, combination information corresponding to the clothes, the bag, the hat, and the like corresponding to the preference is selected.

Then, the combination extracting portion 14 extracts the product image data of the clothes, the bag, the hat, and the like that coincide with or is similar to the above-described combination information (Step S16). Then, the combination extracting portion 14 transmits one type or a plurality types of wearing image data, in which a model wears the clothes, the bag, the hat, and the like that have been selected to match with the shoes, to the user terminal 2 by adding the combination identification information to each combination (Step S17).

When receiving the wearing image data, the user terminal 2 displays the wearing image data on the display screen. Accordingly, the user can acquire information on the combination of fashions corresponding to his or her preference for the product that has been searched for or purchased.

Here, by the user's performing the positive and negative determination as described above, the user terminal 2 transmits the positive and negative determination data in association with each combination identification information to the search server 1 as the determination result information with its user identification information added thereto.

Then, when receiving the determination result information as input, the transmission portion 17 determines whether the added user identification information is registered in the user registration table. When the user identification information is registered in the user registration table, the transmission portion 17 outputs the above-described determination result information to the preference extracting portion 15.

The preference extracting portion 15 generates combination preference information based on the positive and negative determination pattern corresponding to the input combination identification information. This combination preference information is formed by a combination of the form, the color, the shape, and the texture, and the like of other clothes, bags, hats, and the like that have been positively determined in association with the form, the color, the shape, the texture, and the like of the shoes. Every time the user purchases a product, the preference is learned, whereby the accuracy of the combination preference information is improved.

In other words, when the user purchases a bag based on the combined wearing image data, the preference information for the bag is searched for, and the combination preference information of the shoes, the clothes, the hat, and the like corresponding to this preference information can be acquired, whereby the preference of each user is sequentially narrowed.

In addition, as a challenge combination (a combination that is not normally selected by a user, or a combination that is different from the above-described preference information), it may be configured that a fashion coordinator randomly selects several products corresponding to combination information, which is extremely different from the combination information selected based on the preference information, from the product table, and theses selected products are inserted into several combinations at the time of generation of the wearing image data.

Accordingly, the user's preference is diversified, whereby there is a possibility that the user's purchase desire increases.

Figure 6:
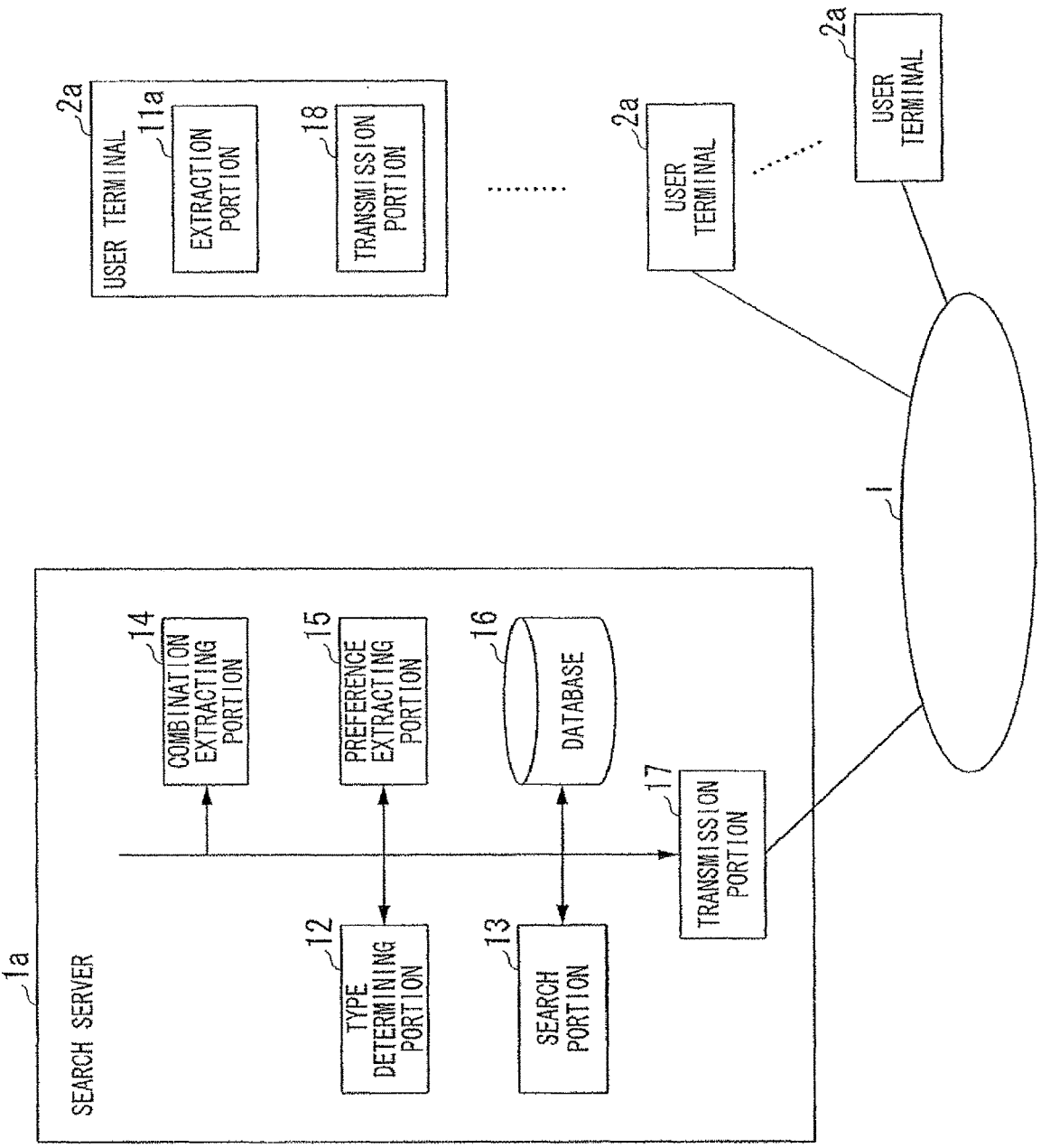
FIG. 6 is a block diagram representing a modified example of the example of the configuration of the search supporting system according to this embodiment.

In addition, the search supporting system according to this embodiment, as shown in FIG. 6, the user terminal 2 may include a user terminal 2a configured to have an extraction portion 11a that has the same extraction function as that of the above-described extraction portion 11 and a search server 1a other than the extraction portion 11. In such a case, the extraction portion 11a extracts a search portion (for example, a product portion) of input image data based on the input image data acquired by the user terminal 2a or the input image data stored in the user terminal 2a and transmits only the image data corresponding to the search portion to the search server 1a. In addition, since portions other than the extraction portion 11a are the same as those of the above-described embodiment, a description thereof is omitted. As described above, the user may transmit only the image data corresponding to the search portion of the input image data to the search server 1a as the image data to be transmitted. For example, the image data corresponding to the user's face portion or other persons' face portions needs not to be transmitted to the search server 1a.

In addition, in this embodiment, the search supporting system of the present invention may be applied not only to the products such as clothes or shoes but also to the above-described targets. In addition, for example, the search supporting system of the present invention may be applied to services that are provided in an accommodation facility (a hotel or an inn), a restaurant, or the like. For example, in the above-described accommodation facility, the search supporting system of the present invention may be applied to a case where a combination of room arrangements, a combination of sceneries of windows, or a combination of rooms or room layouts and sceneries of windows, or the like is selected. In addition, for example, in the above-described restaurant or the like, the search supporting system of the present invention may be applied to a case where a combination of interiors of the restaurant, a combination of sceneries of windows, a combination of music, a combination of an interior and the scenery of a window, a combination of an interior and music, a combination of the scenery of a window and music, or the like is selected.

Second Embodiment

Hereinafter, a product search supporting system according to an embodiment of the present invention will be described with reference to drawings.

Conventionally, when combined products (for example, garments, combined furniture, combined electric appliances, or the like) acquired by combining a plurality of products of different types (categories) are to be purchased, in a case where a customer does not actually go to a retail store, the customer cannot directly ask store personnel which combination is appropriate.

In addition, when a user selects a product, which matches well a product purchased by the user or a product to be purchased for a case where the products are combined, for himself from a vast product group of a virtual store, the user cannot check one by one with a coordinator of the combined products, and the user cannot select the product for himself. Accordingly, the user cannot purchase the product.

For example, even when the user wants to select pants or a shirt that match a jacket purchased by the user from garments, the user cannot check the selection with a first-class fashion coordinator and worries about selection of an inappropriate combination, and accordingly, the user gives up the purchasing of matching pants or a matching shirt.

Here, the garments represent all the clothes and personal ornaments (an accessory, a bag, shoes, a hat, and the like) that are worn around a natural human body in the same state as it is born.

This embodiment also solves such a problem. This embodiment supports a user's purchase of combined products by extracting products that match a product that is to be purchased or has been purchased by the user and recommending the extracted products to the user in purchasing the combined products.

Figure 7:
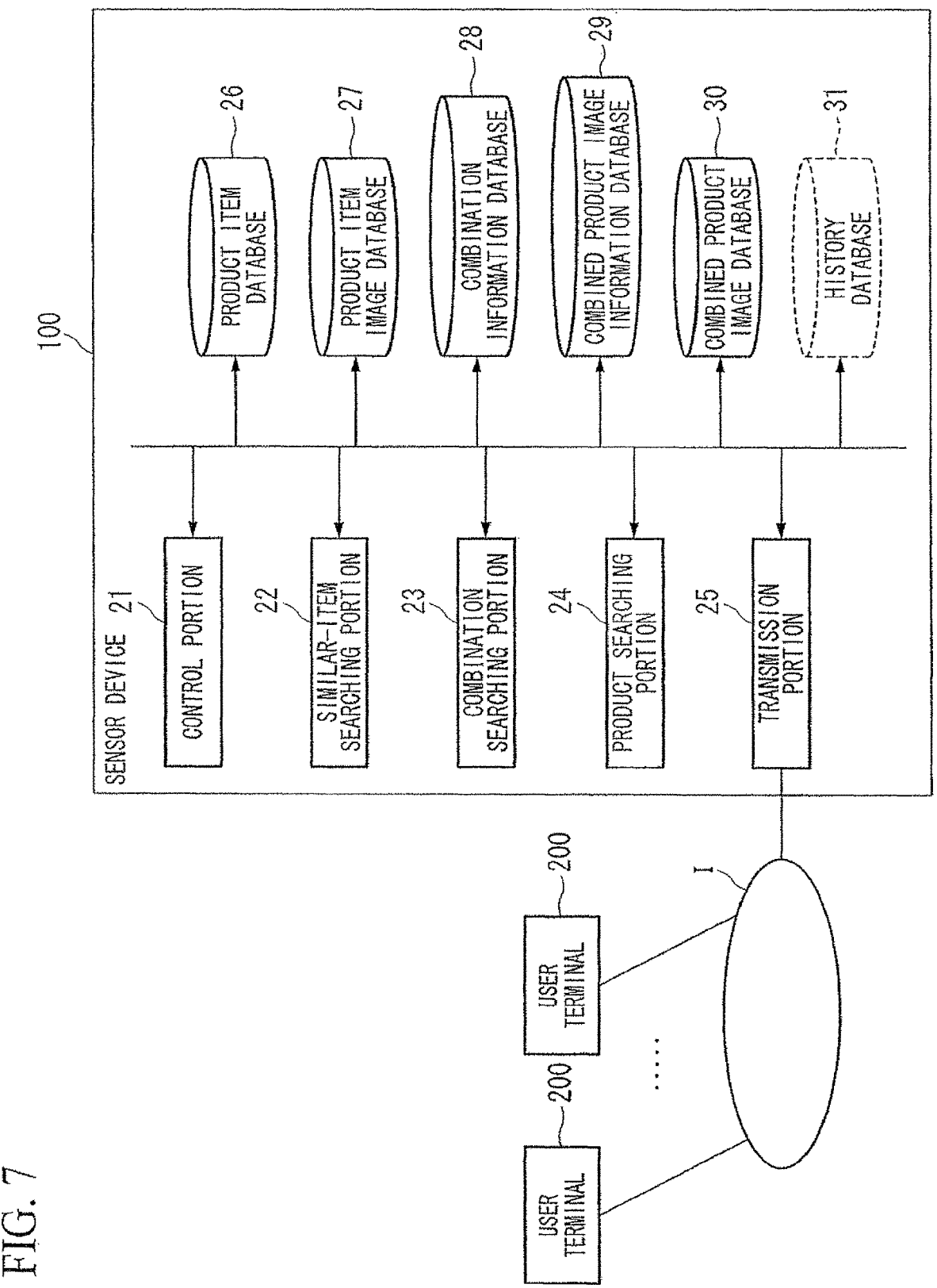
FIG. 7 is a block diagram representing an example of the configuration of a product search supporting system according to an embodiment of the present invention.

FIG. 7 is a block diagram representing an example of the configuration of the product search supporting system according to this embodiment. The invention is a system that supports a user to easily select a product item, which is thought to form an excellent combination with a product item purchased by the user, from many product items by presenting product items of other categories included in a product item combination that is thought to form an excellent combination with the purchased product when product items of several categories included in the product item combination that is configured by a plurality of categories of product items are purchased. In descriptions below, the total products (products of categories such as a blazer, a coat, a shirt, and pants) of garments are assumed to be the product items, the product items actually sold by the virtual store are assumed to be the product items, and each product item that is combined in an image medium to be described later is described as a combined product item.

In this figure, the product search supporting system is configured by a product search supporting device 100 and one or a plurality of user terminals 200. The product search supporting device 100 has a control portion 21, a similar-item searching portion 22, a combination searching portion 23, a product searching portion 24, a transmission portion 25, a product item database 26, a product item image database 27, a combination information database 28, a combined product image information database 29, and a combined product image database 30. The user terminal 200, for example, is a personal computer that is installed at each user's home and includes an internet browser. The product search supporting device 100 and the user terminal 200 are connected together through an information communication network I that includes the Internet.

The product item database 26 has memory areas configured as a plurality of tables for types of the product items.

In other words, the product item database 26, as represented in FIG. 8, has a memory area configured as a table in which the attribute information of the product items that are to be sold is stored for identification information A1 to An of the product item of a shirt as Category 1.

In addition, similarly, the product item database 26, as represented in FIG. 9, has a memory area configured as a table in which the attribute information of corresponding product items for the identification information B1 to Bn of the product item of pants as Category 2 is stored.

In addition, similarly, the product item database 26, as represented in FIG. 10, has a memory area configured as a table in which the attribute information of corresponding product items for the identification information C1 to Cn of the product item of a jacket as Category 3 is stored.

Furthermore, the product item database 26, although not represented in the figure, has memory areas in which a plurality of tables for shoes, a blouse, a bag, or the like as categories of the garments other than the above-described categories is stored.

In addition, in each table of the product item database 26, a similar-product item field is set up as one type of the attribute information. Thus, the product items of the combined product image information database 29 that are the same as or similar to the product item are written so as to be associated as a group of product items that is similar to each purchase product item, as represented in FIG. 11 (Category 1—shirt), FIG. 12 (Category 2—pants), and FIG. 13 (Category 3—Jacket).

Here, the attribute information includes the identification information of combined product items (product items included in the combined product image information database 29 to be described later) that can be associated to be the same or similar to each other, the characteristics data of an image that is extracted from the image data of the product item, sales information such as the price, the brand, and the like of the product item, and the like. The types of the characteristics data of the image and a method of acquiring the characteristics data will later be described.

In the product item image database 27, image data for each product item of each category that is stored in the product item database 26 is stored in association with the identification information of each product item.

In the combination information database 28, garment products that are worn by a model or anyone else as a combination in a fashion magazine, a fashion catalog, and an image medium on the Internet, that is, the product items that are worn as the combination are set as combined product items, and each combination of the correspondence relationship between a combined product item and a combined product item combined thereto is stored in association with the identification information. For example, when a model wears the product items of a shirt having identification information a1-1, pants having identification information b1-2, and a jacket having identification information c1-7 in a fashion journal, as represented in the first row in the combination information database 28 represented in FIG. 14, a combined product item configured by the identification information a1-1, the identification information b1-2, and the identification information c1-7 is stored as a set in association with one another.

In this combination information, a combination of product items that are manufactured as a combination by a fashion designer or a combination of the product items, which are manufactured by a fashion designer, combined by a fashion coordinator is the combination of the combined product items. Accordingly, the combined product items form an elegant combination. Thus, when such a combination is worn, there is a high possibility that a person who sees the fashion accepts the combination naturally without having a feeling of oddity.

In the combined product image information database 29, combined product items of garments that are acquired from fashion journals, fashion catalogs, and image media (a material or a device that presents an image such as a photo or an illustration of a journal) on the internet such as designer's correction information are accumulated for each category. Here, the combined product image information database 29, for example, is configured by tables having the configurations represented in FIGS. 15, 16, and 17.

FIG. 15 represents a table in which shirts as Category 1 are accumulated as the combined product items. FIG. 16 represents a table in which pants as Category 2 are accumulated as the combined product items. FIG. 17 represents a table in which jackets as Category 3 are accumulated as the combined product items. In the combined product image information database 29, identification information is assigned to the combined product item, and the attribute information of a corresponding combined product item is stored for the identification information. This attribute information, for example, includes the identification information of a similar product item, characteristics data of an image that is extracted from the image data of the combined product item, sales information such as the price and the brand of the combined product item, and the like. The types of the characteristics data and a method of acquiring the characteristics data will later be described.

In addition, in each table of the combined product image information database 29, a similar-product item field is set up as one type of the attribute information. Thus, the product items, included in the product item database 26, that are the same as or similar to the combined product item are written so as to be associated as represented in FIG. 15 (Category 1—shirt), FIG. 16 (Category 2—pants), and FIG. 17 (Category 3—Jacket).

In the table of the combined product image information database 29 that is represented in FIG. 15, the identification information a1-1 to a1-*k* is stored as the combined product items that are the same as or similar to the product item A1, the identification information a2-1 to a2-*k* is stored as the combined product items that are the same as or similar to the product item A2, and the identification information a*n*-1 to a*n*-*m* is sequentially stored as the combined product items that are the same as or similar to the product item A*n*.

Similarly, in the table of the combined product image information database 29 that is represented in FIG. 16, the identification information b1-1 to b1-*m* is stored as the combined product items that are the same as or similar to the product item B1, the identification information b2-1 to b2-*r* is stored as the combined product items that are the same as or similar to the product item B2, and the identification information b*n*-1 to b*n*-m is sequentially stored as the combined product items that are the same as or similar to the product item B*n*.

Similarly, in the table of the combined product image information database 29 that is represented in FIG. 17, the identification information c1-1 to c1-*q* is stored as the combined product items that are the same as or similar to the product item C1, the identification information c2-1 to c2-*k* is stored as the combined product items that are the same as or similar to the product item B2, and the identification information c*n*-1 to c*n*-m is sequentially stored as the combined product items that are the same as or similar to the product item C*n*.

In the combined product image database 30, the image data for every combined product item of each category that is stored in the combined product image information database 29 is stored in association with the identification information of each combined product item.

In addition, the product item database 26, the product item image database 27, the combination information database 28, the combined product image information database 29, and the combined product image database 30 that have been described above may be classified based on the gender, the age, the trend of fashions (for example, a casual style, a conservative style, a brother style, an adult style, a street style, a Urahara (Harajuku) style, and a Mod style for men, and a girl style, a sister style, a conservative style, a teen style, a celebrity style, and the like for women) or the like.

When the databases are classified as above, the gender, the age (10's, 20's, 30's, and the like), the fashion style, and the like must be acquired from the user as classification information.

The control portion 21 starting to operate as a virtual store managed by the control portion 21 is accessed from the user terminal 200 and transmits a process program (operates in accordance with a browser or the like of the user terminal) for acquiring information on the classification of the gender, the age, the fashion style, and the like or performing a display and selection operation for a combination item to be described later to the user terminal 200. Here, the control portion 21 and the user terminal 200 perform data transmission and data reception through the information communication network I and the transmission portion 25. The user terminal 200 starts the above-described process program in an internal browser and performs data transmission and data reception for the product search supporting device 100 in the process for displaying an image or selecting a product item or a combined product item.

In addition, when receiving reply data for the screen data from the user terminal 200, the control portion 21 selects one product item table from a plurality of product item databases 26 corresponding to the gender, the age, and the fashion style and transmits the category information that indicates the category of the combined product item, for example, text information or image information of a shirt, pants, a jacket, shoes, or the like to the user terminal 200 through the transmission portion 25 and the information communication network I.

In addition, when receiving the type of the category selected by the user which is transmitted from the user terminal 200, for example, the category information representing a shirt, the control portion 21 selects a table represented in FIG. 8 for the category of the shirt (Category 1) as the product item database 26, reads in the identification information A1 to A*n* of the product items included in this table, and reads in the image data of the product items having the identification numbers A1 to A*n* from the product item image database 27. Then, the control portion 21 converts the image data into image data of a thumbnail image (reducing the number of bits of the image data) and transmits the converted image data to the user terminal 200 with the identification number of each corresponding product item added thereto.

In addition, when the identification number of the product item that is selected so as to be purchased from the thumbnail image by the user is input, the control portion 21 performs an order receiving process for the order and transmits the input identification number to the similar-item searching portion 22. Here, the order receiving process includes billing charges corresponding to the price that is written in the attribute information, checking stock of the ordered product item, a delivery procedure of the product item to the address input by the user, and the like for the user terminal 200.

The similar-item searching portion 22 searches for a plurality of combined product items having the similar-product item fields, in which the identification number that coincides with the identification number of the input product item is written, from the table (Category 1) of the combined product image information database 29, extracts combined product items that are the same as or similar to the above-described product item, and outputs the extracted combined product items to the combination searching portion 23.

The combination search portion 23 searches for the product items of a different category, for example, the product items of the pants (Category 2) corresponding to the similar product items having the identification number that is input from the similar-item searching portion 22 from the combination information database 28, extracts corresponding product items, and outputs the identification information of the combination to the control portion 21 as a second combined product item.

In addition, the control portion 21 reads out the image data corresponding to the identification information of a plurality of combinations of the identification information of the similar product item input from the combination searching portion 23 and the identification information of the second combined product item from the combined product image database 30 in correspondence with the identification information, transmits the read-out image data to the user terminal 200, and outputs received identification number to the product searching portion 24 at a time when the identification information of the combined product item of the combination selected by the user is received.

The product searching portion 24 searches for the product item, which is actually sold, corresponding to the received identification information of the second combined product item from the product item database 26, sets the found product item as a recommended product item of a different category that is combined with the product item purchased by the user, reads out the image data of the recommended product item from the product item image database 27 by using the identification information, and transmits the read-out image data to the user terminal 200.

In addition, the product search portion 24 may be configured to determine whether the amount of the product item set as the recommended product is in the set range (for example, within 0.5 to 2 times of the amount of the purchased combined product) by comparing the amount with the amount of the product item purchased by the user, transmit the recommended product to the user terminal 200 in cases where the amount of the recommended item is equal to or smaller than the purchased amount and to not transmit the recommended product for a case where the amount of the recommended item is out of the range.

Figure 18:
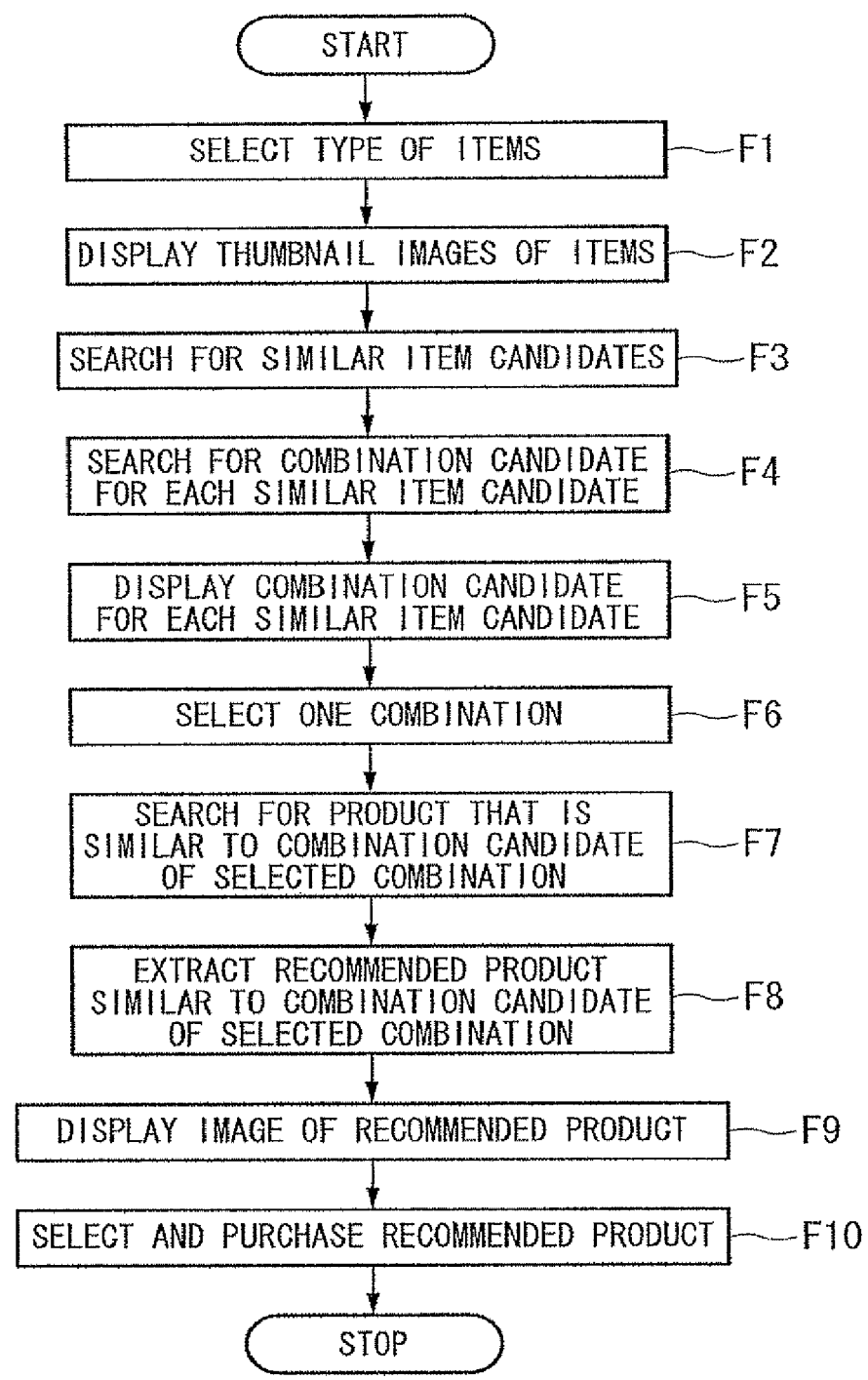
FIG. 18 is a flowchart representing an example of the operation of the product search supporting system of FIG. 7.

Next, the operation of the product search supporting system according to this embodiment will be described with reference to FIGS. 7 and 18. FIG. 18 is a flowchart representing an example of the operation of the product search supporting system represented in FIG. 7. Hereinafter, a product input by the user is described as a product item, products that are actually sold in the virtual store is described as product items (the product item database 26), and a product extracted from the image medium that is used at the time when a combination of products is selected is described as a combined product item (the combined product image information database 29).

When the user terminal 200 accesses the virtual store that is managed by the product search supporting device 100 through the information communication network I in accordance with the user's operation, the control portion 21 transmits a process program for displaying information for acquiring information on the gender, the age, and the fashion style and the combined item to be described later or performing an selection operation for a displayed image to the user terminal 200. Within the user terminal 200, an image display processing portion and a selection processing portion are included within the internet browser by the above-described process program, and the user terminal 200 displays the image data transmitted from the product search supporting device 100 and performs an editing process for the image data and a selection process for the image data.

Then, when receiving reply data (for example, data selected from a plurality of selection options displayed on the screen) for the gender, the age, and the fashion style that are input to the screen data from the user terminal 200, the control portion 21 selects a table out of a plurality of tables of the product item database 26 corresponding to the gender, the age, and the fashion style and transmits the category information that indicates the category of the product item, for example, text information or image information of a shirt, pants, a jacket, shoes, or the like to the user terminal 200 through the transmission portion 25 and the information communication network I.

When the text information or the image information is received, the user terminal 200 displays the category (for example, a shirt, pants, a jacket, or the like) on the basis of the text information or the image information in a display portion in accordance with the above-described process program and performs display (for example, "Please select" or the like) for urging the user to select any one for purchase.

When the user selects several categories, the user terminal 200 transmits the category information that indicates the categories selected by the user, for example, the category information indicating the shirt to the product search supporting device 100 (Step F1).

In other words, when receiving the category information of a product item desired to be purchased by the user, the control portion 21 selects the table, which is represented in FIG. 8, having the shirt as the category (Category 1) out of the tables of the product item database 26 represented in FIGS. 8 to 10 and reads out all the identification information A1 to An of the product items included in this table. Then, the control portion 21 reads out the image data of the product items having identification numbers A1 to An from the product item image database 27 and transmits the image data as the image data of the thumb nail image to the user terminal 200 with the identification numbers of the product items corresponding to the thumb nail images added thereto.

When receiving the image data of the thumbnail images, the user terminal 200 displays the thumbnail images of the product items having the identification numbers A1 to An in the display portion (F2).

Then, when the user selects any one of the displayed thumbnail images, the user terminal 200 transmits the identification information of the selected thumbnail image to the product search supporting device 100.

When receiving the identification information of the selected thumbnail image, the control portion 21 performs an order receiving process for the order for the product item of the identification number, that is, a shirt as the product item selected as a purchase target from the thumbnail images by the user and transmits the received identification number to the similar-item searching portion 22.

Then, when receiving, for example, the identification number A1 of the product item purchased by the user, the similar-item searching portion 22 extracts a candidate group that is formed by one or a plurality of combined product items that coincide with or is similar to the identification number A1 from the tables of the combined product image information database 29 represented in FIGS. 15 to 17 (Step F3).

Here, for example, when receiving the identification number A1 of the product item from the combined product image information database 29, the similar-item searching portion 22 extracts the combined product items having the identification numbers a1-1 to a1-$q$ in which the identification number A1 is written in the similar-product item field of the attribute data as a candidate group of a similar combined product item and outputs the combined product item to the combination searching portion 23.

The combination searching portion 23 searches for combined product items of a different category, for example, combined product items of pants corresponding to the combined product items of the identification numbers of the candidate group that are input from the similar-item searching portion 22 from the combination information database 28 represented in FIG. 14 and extracts the corresponding combined product items (for example, b1-2, b2-3, b1-4, . . . corresponding to a1-1, a1-2, a1-3, . . . represented in FIG. 14) of the pants, and outputs the identification information of the combination to the control portion 21 as the second combined product item (Step F4). Here, the category recommended as the combined product item combined with the product item purchased by the user may be set in advance in correspondence with the purchased product or may be initially selected by the user from a plurality of categories.

Then, the control portion 21 reads out image data corresponding to a plurality (corresponding to the number of combined product items corresponding to the candidate group) of combinations of the identification information of the combined product item input from the combination searching portion 23 and the identification information of the second combined product item from the combined product image database 30 in association with the identification information and transmits the read-out image data of each product item to the user terminal 200 with corresponding identification information added thereto.

When the plurality of combinations of the identification information (corresponding to the shirt) of the combined product item and the identification information (corresponding to the pants) of the second combined product item and the image data corresponding thereto are received, the user terminal 200 displays the image data of each combination in the display portion (Step F5).

In addition, a plurality of three-dimensional human images corresponding to each body type, which are created by CG (computer graphics), is displayed in the end portion of the display screen, and by selecting any one of the plurality of the human images, the user terminal 200 displays the shirt and the pants of the combined product item so as to be overlapped with the human image. In addition, it may be configured that the user photographs his or her face by using a mounted web camera, and the user terminal 200 performs an image processing for displaying the face area, which is selected by the user, so as to be overlapped with the face portion of the CG human face.

Next, when the user selects any one of the plurality of combinations displayed in the display portion (Step F6); for example, when the user selects a combination of the identification information a1-1 and the identification information b1-2, the user terminal 200 transmits the identification information b1-2 of the second combined product item (corresponding to the pants) of the combination selected by the user to the product search supporting device 100.

When receiving the identification information b1-2 of the above-described second combined product item through the control portion 21, the product searching portion 24 searches the table, which is represented in FIG. 9, of the product item database 26 corresponding to the category of the pants (Step F7) and extracts the product item having the identification information B1 corresponding to the identification information b1-2 (Step F8).

Then, the control portion 21 searches for the image data corresponding to the identification information B1 of the combined product item extracted by the product searching portion 24 from the product item image database 27 and reads out the found image data.

In addition, the control portion 21 searches for and reads out the image data corresponding to the identification information A1 purchased by the user from the product item image database 27 and transmits the read-out image data together with the image data of the product item having the identification information B1 to the user terminal 200.

When receiving the image data of the product item, the user terminal 200 displays combined image data in the display portion (Step F9).

At this moment, same as in the above-described Step F5, a plurality of three-dimensional human images for each body type, which is created by the CG, is displayed in the end portion of the display screen. Thus, by selecting any one of them, the user terminal 200 displays the shirt (identification information A1) and the pants (the identification information B1) of the product items so as to be overlapped with the above-described human image. In addition, the user terminal 200 may be configured so as to photograph the user's face by using a mounted web camera, and displays the area of a face selected by the user so as to be overlapped with the face portion of the above-described human image.

Then, when the user selects the purchase or non purchase of the recommended product out of the product items having the identification information B1 from the option displayed on the display screen (Step F10), the user terminal 200 transmits the identification information A1 and the identification information B1 together with information that indicates the purchase or non-purchase of the recommended product to the product search supporting device 100.

When receiving the identification information A1 and the identification information B1 together with the information that indicates the purchase or non purchase as input, in cases where the purchase is selected, the control portion 21 performs an order receiving process, same as for the case of the product item having the identification information A1.

In addition, a history database 31 denoted by a broken line represented in FIG. 7 may be provided in the product search supporting device 100.

The history database 31 is configured by a user table configured as a table represented in FIG. 19 and a purchase history table for each user which is configured as a table represented in FIG. 20.

The user table represented in FIG. 19 is configured such that user identification information that is assigned to each user who has been registered as a member or has purchased a product item and is used for identifying each user and at least the user's name and the user's mail address corresponding to the user identification number can be associated with each other.

In addition, the purchase history table represented in FIG. 20 is set up for each user. In the purchase history table, in association with the access date and time at which the virtual store is accessed, identification information of the product item that has been purchased at the access date and time, identification information of a product item that has been searched for and not purchased, and identification information of a combined product item that has been recommended for the purchased product item and not been purchased, which are identified by the above-described user identification information, are stored as history. When there is no product that has been purchased "–" is stored.

For example, when a user accesses the virtual store from the user terminal 200 and performs membership registration by inputting his or her name and mail address in a membership registration page, the control portion 21 assigns identification information to the user and additionally registers the user in the user table.

Then, when the user searches for a product item of a category selected by the user and purchases the product item, the control portion 21 stores the purchased product item in the area for the identification information of the purchased product items. On the other hand, when the user searches for a product item but does not purchase the product item, the control portion 21 stores the identification information of the product item that has been searched for in the area for the identification information of the product items that have been searched for but have not been purchased.

In addition, when the user purchases a product item as a recommended product that is combined with the above-described purchased product item, the control portion 21 stores the purchased product item in the area of the above-described purchase history table for the identification information of the purchased product items. On the other hand, when the user does not purchase the product item as the recommended product item, the control portion 21 stores the identification information in the area for the identification information of the product items that have been recommended but not been purchased.

Then, when the user accesses the virtual store again and searches for a product item, the control portion 21 selects the user's purchase history table from the purchase history database 31 by using the user identification information input by the user and searches the selected purchase history table by using the identification information of the product item.

At this moment, when the identification information of the product item that the user searches for is detected in the area for the identification information of the purchased product items, the control portion 21 transmits the product item to the user terminal 200 with the purchased date and time of the same product item added thereto so as to be displayed on the display screen, whereby notifying the user of the combined product item that has already been purchased.

On the other hand, when the identification information of the product item, which is searched for, is detected in the area for the identification information of the product items that have been searched for but not been purchased, the control portion 21 notifies the user of information that stimulates the purchase desire such as "Is this product item a product item that was also searched for in the past and is the type you like?" by transmitting the product item with the search date and time for the same product item added thereto to the user terminal 200 so as to be displayed on the display screen.

On the other hand, when the identification information of the product item, which is searched for, is detected in the area for the identification information of the product items that have been recommended but not been purchased, the control portion 21 notifies the user of information that stimulates the purchase desire such as "This product item is an excellent combination with the product item purchased in the past" by transmitting the product item with the search date and time for the same product item added thereto to the user terminal 200 so as to be displayed on the display screen.

Next, the characteristics data will be described. For example, the characteristics data is acquired by performing a two-dimensional Fourier transform for the pattern of the fabric of the garment for each color space of R (red), G (green), and B (blue) as represented in FIGS. 8 to 10 and FIGS. 15 to 17. The control portion 21 creates element data RD, GD, and BD of the characteristics data by performing the two-dimensional Fourier transform. At this moment, when the product item or the combined product item is a shirt or a jacket, the horizontal width or the shoulder width of the clothes is used as a reference value of the length for the two-dimensional Fourier transform, so that data is matched in the process for each product item and the combined product item.

On the other hand, when the product item or the combined product item is pants, the horizontal width of the waist portion is used as a reference value of the length for the two-dimensional Fourier transform, so that data is matched in the process for each product item and the combined product item.

In other words, since the similarity is checked by using the characteristics data, in order to determine the size of the pattern and the like as the attributes, the sizes of the total portions need to be normalized by using the measurements of several positions of the accessory, so that the results of the two-dimensional Fourier transform for the combined products included in the same category are matched. When the image data for which the two-dimensional Fourier transform is performed is to be photographed, a shirt, a jacket, pants, and the like are photographed by using a digital camera or the like after being flattened on a flat floor.

In addition, a shape as the element data of the characteristics data, for example, is a ratio of the length of the sleeve to the shoulder width for a shirt or a jacket and is a ratio of the thigh width to the bottom width for pants.

Next, the texture is acquired by enlarging a fabric portion having the largest area and performing a two-dimensional Fourier transform for the enlarged fabric portion. At this moment, data for the two-dimensional Fourier transform that can be acquired from the image data for different combination items is matched by fixing the enlargement ratio at a constant value.

As described above, the store personnel of the virtual store, by using the control portion 21, collects the characteristics data from the image data of the product items that are sold and collects the attribute data from the image data of combined product items that is collected from image media such as fashion catalogues or the Internet.

Then, for the combined product items having similarity, clustering of the combined product items collected from the image media is performed by using the characteristics data of the product items that are actually sold as the center data of the cluster. Here, the control portion 21, for example, calculates a distance between a comparative characteristics vector that is configured by characteristics data of the image data of each combined product item collected from the image media input by the store personnel and a reference characteristics vector that is configured by the characteristics data of the image data of each product item that is actually sold. Then, the control portion 21 performs a process in which a combined product item having the characteristics vector that has a distance from each product item shorter than that of the reference characteristics vector of other combined product items is regarded as a cluster having the similarity for the product item regarded to be close from the combined product item, whereby generating the correspondence relationships between the combined product items included in the tables of FIGS. 15, 16, and 17 and the product item placed in the similar product item field. Similarly, the correspondence relationships between the product items included in the tables of FIGS. 8, 9, and 10 and the combined product items placed in the similar product item field are generated. In other words, the identification information written in the similar product item field of the table of FIGS. 8, 9, and 10 is the identification information of combined product items having shorter distances, that is, having similarity relative to other product items that are sold for the product item, which is sold, having the corresponding identification information.

Here, the control portion 21, for example, may be configured to store the combined product items so as to be aligned in the similar product item fields of each figure of FIGS. 8 9, and 10 in the order of shorter distances, that is, in the order of higher similarities. Accordingly, when a combined product item that is the most similar to the product item is to be selected, the similar-item searching portion 22 can extract the most similar combined product item or combined product items up to the combined product item that has the h-th highest similarity from the highest similarity side (h is set in advance) from the combined product items, which are collected from the image media, more easily than those of FIGS. 15 to 17.

In addition, instead of performing clustering in advance by comparing the reference characteristics vector of each product item with the characteristics data of a combined product item, which has been collected from the image medium, having a comparative characteristics vector that has a short distance and arranging the fields for writing the identification information of the similar product items, as described above, the similarity may be configured to be calculated each time when the similar combined product item is searched for.

For example, in searching for the combined product item, which has been acquired from the image medium, similar to the product item in Step F3, a configuration in which the similar-item searching portion 22 calculates the similarity (the similarity is high as the distance is shorter) based on the distance between the above-described reference characteristics vector and the comparative characteristics vector, and the combined product item, which has been collected from the image medium, having similarity to the product item is extracted may be used.

At this moment, similarly, in searching for the product item that is similar to the combined product item acquired from the image medium in Step F7, a configuration in which the product searching portion 24 calculates the similarity based on the distance between the above-described reference characteristics vector and the comparative characteristics vector, and the product item having similarity to the combined product item collected from the image medium is extracted may be used.

Furthermore, it may be configured that the similar-item searching portion 22 and the product searching portion 24 calculate the distance between the product item and the combined product item collected from the image medium and extracts the product item having the highest similarity or product items up to a product item having the h-th highest similarity from the highest similarity side.

As described above, according to this embodiment, in purchasing combined products, when a product that matches well for a case where the product is combined with the product that is to be purchased or has been purchased by the user is extracted from a product group that is sold and a matching product is selected from many products of many stores arranged in the virtual store on the Internet for recommending the extracted product to the user, the user can easily select the combined products without worrying about the match of the combined products.

Third Embodiment

In the second embodiment, the product search supporting device 100 transmits the product items to the user terminal 200 by using the thumbnail images for being selected by the user on the screen of the user terminal 200.

According to the third embodiment, it may be configured that image data of a garment desired to be purchased which has been read in from the image medium by using a scanner or the like or been downloaded from the Internet after the user accesses the virtual store is input to the user terminal 200 as the image data of the product item, the image data is transmitted to the product search supporting device 100 by the user terminal 200, and the product search supporting device 100 extracts a product item that is similar to the combined product item of the image data. The operation after extraction of the product item is the same as that after the user's selection of the product item from the thumbnail images in the second embodiment.

The configuration of the product search supporting device 100 according to the third embodiment is the same as that of the second embodiment. Hereinafter, only operations that are different from those of the second embodiment will be described.

When the user accesses the virtual store by using the user terminal 200, the product search supporting device 100 starts to operate, and the control portion 21 transmits the image data of an input screen (options are clicked by using a mouse or the like for a search) used for inquiring of the user terminal 200 whether the product item is selected from thumbnail images or the similar product item is extracted from the product item database 26 by using the image data of the garment that is input by the user to the user terminal 200.

Then, when a reply signal indicating selecting by using the thumbnail images is input from the user terminal 200 by user's determination on selecting a product to be purchased from the thumbnail images, the control portion 21, same as in the second embodiment, transmits thumbnail images of a plurality of product items to the user terminal 200 with identification information of the product items added to each image data. Thereafter, the process is the same as that of the second embodiment after the user selects any of the thumbnail images.

On the other hand, when the user selects to extract a similar product item from the product item database 26 by using the image data input by the user, the user terminal 200 transmits a reply signal that represents selecting of the product item by using the image data input by the user to the product search supporting device 100. Accordingly, the control portion 21 transmits information on the input screen from which the image data is input to the user terminal 200.

The user allows the image data (a paper image medium such as a fashion journal or a fashion catalogue) of a garment desired to be purchased to be read in by the user terminal 200 by using a scanner, or the user photographs by using a digital camera and allows the user terminal 200 to read in the photographed image data or the image data acquired through the Internet.

Figure 21:
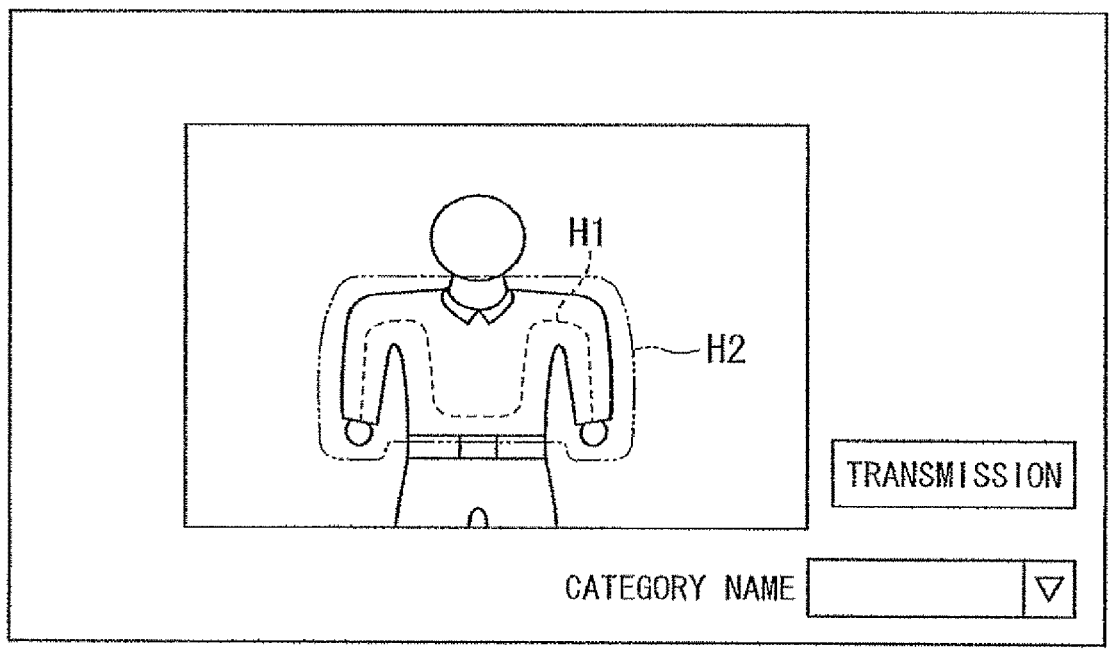
FIG. 21 is a conceptual diagram for describing division of image data by using a Graph-Cut method.

When the image data is read in, the image data is displayed in the image data display area of the input screen of the user terminal 200 as represented in FIG. 21. Then, the user selects the garment portion of the image data desired to be purchased, for example, a shirt portion desired to be extracted by using a broken line H1 and selects a portion (a portion near outer periphery portion of the shirt) other than the shirt portion desired to be extracted selected by a broken line 2, selects the category name by using a combo box, and then clicks on the transmission button located on the display screen. Accordingly, the user terminal 200 detects that a process for transmitting the image data is requested and transmits the image data of the garment drawn by the broken line H1 and the broken line H2, the image data of the garment that is not drawn, and category information representing the category name of the selected garment to the product search supporting device 100.

Then, when receiving the image data of the garment drawn by the broken line H1 and the broken line H2 and the image data not drawn by a broken line, the control portion 21 performs a process for dividing the image data of the garment into the shirt portion and the other portion by using a Graph-Cut method, whereby extracting the shirt portion.

In other words, the control portion 21 performs division by calculating the boundary between the area having a pixel value that is the same as the pixel located on the broken line H1 that is drawn in the shirt portion and an area having the same pixel value as that of the pixel on the broken line H2 drawn other than the shirt portion as a position in which the error of the error function on the basis of the gradient becomes the minimum.

Here, when the shirt portion is extracted, the control portion 21 performs the two-dimensional Fourier transform and extracts the shape data as an element of the characteristics data and outputs the shape data as the detection target characteristics data, as described above.

Then the control portion 21 selects a table corresponding to the category of the extracted garment, for example, the shirt table according to this embodiment from the product item database 26.

After selecting the shirt table, the control portion 21 calculates a distance between the reference characteristics vector that is configured by characteristics data of the product items of the table and the target characteristics vector that is configured by the above-described detection target characteristics data and extracts the product items that have characteristics data similar to the detection target characteristics data from the shirt table up to the product item having the h-th highest similarity; for example, product items having up to the fifth highest similarity. Here, the control portion 21 cannot easily extract the texture as the characteristics data from the image data that has been transmitted from the user. Thus, when the characteristics vector is to be generated from the characteristics data, the distance of both characteristics vectors to be compared with each other is calculated by excluding the texture from the elements of the vector.

Next, the control portion 21 reads out the image data of each product item from the product item image database 27 based on the identification information of the highest five product items and transmits the image data to the user terminal 200 as thumbnail images in association with the identification information. The process thereafter is the same as that after transmission of the thumbnail images in Step F2 of the flowchart according to the second embodiment represented in FIG. 18.

Fourth Embodiment

In the third embodiment, the product item identical to the image data of the product item input by the user or the same product item is searched for from the product item database 26 in which product items that are sold are stored and the found product item is presented to the user, and a process for recommending the product item of a different category that is combined with the found product item is performed.

According to the fourth embodiment, an operation for searching for a product item that is combined with the garment owned by the user in advance is performed.

The user photographs the garment owned by him or her, for example, a shirt by using the digital camera and allows the user terminal 200 to read in the image data of the shirt by using the digital camera.

Then, when the user accesses the virtual store by using the user terminal 200, the product search supporting device 100 starts to operate. When the user accesses the virtual store by using the user terminal 200, the product search supporting device 100 starts to operate, and the control portion 21 transmits the image data of an input screen (options are clicked by using a mouse or the like for a search) used for inquiring the user terminal 200 whether the product item is selected from thumbnail images, the similar product item is extracted from the product item database 26 by using the image data of the garment that is input by the user, or a combined product item is recommended to the garment of the image data input by the user to the user terminal 200.

Then, when a response signal indicating selecting by using the thumbnail images is input from the user terminal 200 by user's determination on selecting a product to be purchased from the thumbnail images, the control portion 21, same as in the second embodiment, transmits thumbnail images of a plurality of product items to the user terminal 200 with identification information of the product items added to each image data. Thereafter, after the user selects any of the thumbnail images, the process is the same as that of the second embodiment.

On the other hand, when the user selects to extract a similar product item from the product item database 26 by using the image data input by the user, the user terminal 200 transmits a reply signal that represents selecting of the product item by using the image data input by the user to the product search supporting device 100. The process thereafter is the same as that of the third embodiment.

On the other hand, when the user selects recommendation of a product item of a different category that is combined with the garment of the image data input by the user, the user terminal 200 transmits a reply signal indicating recommendation of the product item combined with the garment of the image data input by the user to the product search supporting device 100.

Hereinafter, the process for recommending a product item combined with the garment of the image data input by the user according to the fourth embodiment will be described. The configuration of the product search supporting device 100 according to the fourth embodiment is the same as that according to the second embodiment. Hereinafter, only operations that are different from those of the first and third embodiments will be described.

As described above, when the user selects recommendation of the product item combined with the garment of the image data input by the user, the user terminal 200 transmits a reply signal that indicates recommendation of the product item combined with the garment of the image data input by the user to the product search supporting device 100. Accordingly, the control portion 21 transmits the information on the input screen from which the image data is input to the user terminal 200.

The user photographs the image data of the garment (for example, a shirt) owned by him or her for which the combined product item is desired to be recommended by using an imaging device such as a digital camera and allows the image data acquired by photographing the garment to be read in by the user terminal 200.

When the image data read in by the user terminal 200 is displayed, the user inputs the category of the garment of the image data displayed in the image data display area by selecting the category from the combo box.

Then, when the user selects the transmission button located on the input screen by using a pointing device such as a mouse, the user terminal 200 detects that a process for transmitting the image data has been requested and transmits the image data displayed in the image data display area to the product search supporting device 100 together with the category information that represents the above-described category.

When the image data is input, the control portion 21 performs the two-dimensional Fourier transform for the garment of the image data, for example, the image data of the shirt and extracts the shape data as an element of the characteristics data and outputs the shape data as the detection target characteristics data to the similar-item searching portion 22 together with the category information.

Then, the similar-item searching portion 22 selects a table corresponding to the category of the extracted garment, for example, a shirt table from the combined product image information database 29.

After, selecting the shirt table, the similar-item searching portion 22 calculates a distance between the reference characteristics vector that is configured by the characteristics data of the combined product items included in the table and the target characteristics vector that is configured by the detection target characteristics data and extracts the product items that have characteristics data similar to the detection target characteristics data from the shirt table up to the product item having the h-th highest similarity; for example, combined product items having up to the fifth highest similarity. Here, the control portion 21 cannot easily extract the texture as the characteristics data from the image data that has been transmitted from the user. Thus, when the characteristics vector is to be generated from the characteristics data, the reference characteristics vector and the detection target characteristics vector are generated by excluding the texture from the elements of the vectors.

Then, the similar-item searching portion 22 output the combined product items having the detecting similarity up to the fifth highest combined product item; for example, identification information corresponding to five shirts to the combination searching portion 23.

When the identification information of the combined product item is input, the combination searching portion 23 reads out the identification information of a different category that is stored in association with the identification information of five input combined product items; for example, the identification information of the combined items of pants from the combination information database 28.

Next, the combination searching portion 23 transmits combinations of the identification information of five combinations between the shirt and the pants to the control portion 21. The process performed thereafter is identical to the process performed from Step F5 in the flowchart of FIG. 18.

Fifth Embodiment

In the combined product image information database 29, the attribute data of the image data of the old garment that is collected from old fashion journals or fashion catalogues published in the past, for example, 10 years ago or 20 years ago may be stored in association with the identification information.

In addition, in the combined product image database 30, the image data of the old garment is stored in association with the above-described identification signal.

Then, in association with the combination of the combined product item published in fashion journals or fashion catalogues in the past, a table of a combination of the combined product items of different categories that is represented in FIG. 14 is generated in the combination information database 28.

As described above, by configuring the combined product image information database, the combined product image database 30, and the combination information database 28, in cases where a new product item that is similar to the old design in the past, it becomes possible easily to extract combined product items for a new combined product item that is similar to the old design of the past from the product item that is currently sold by using the combination of the old design of the past.

In this embodiment, a garment has been described as an example of the product item. However, this embodiment can easily be applied to the entire combined products acquired by combining a plurality of products of different types (categories), for example, combined furniture, combined electric appliances, or the like.

In addition, in each of the above-described embodiments, the process for supporting a product search may be performed by recording a program for implementing the functions of each portion of the search servers 1 and 1a and the product search supporting device 100 in a computer-readable recording medium, reading the program recorded in this recording medium into the computer system, and executing the program. The "computer system" described here includes an OS and hardware such as peripheral devices. In addition, the "computer system" includes a WWW system that has a home-page providing environment (or display environment). In addition, the "computer-readable recording medium" means a portable medium such as a flexible disk, an optical magnetic disc, a ROM, a CD-ROM or the like and a memory device such as a hard disk that is built in the computer system or the like. In addition, the "computer-readable recording medium" includes a device such as a volatile memory (RAM) for a case where the program is transmitted through a network such as the Internet or a communication network such as a telephone line that stores the program for a predetermined time.

Furthermore, the program may be transmitted from the computer system in which this program is stored in a memory device or the like to another computer system through a transmission medium or a carrier waver in the transmission medium. Here, the "transmission medium" for transmitting the program means a medium that has a function for transmitting information including a network (communication network) such as the Internet or the communication circuit line (communication line) such as the telephone line. In addition, the program may be used for implementing a part of the above-described function. Furthermore, one that can implement the above-described function by being combined with a program that is recorded in the computer system in advance, that is, a so-called a difference file (difference program) may be used.

The invention may be used very appropriately in a search supporting system that supports a user to search for a target and to select or determine a target to be searched for through the Internet and technology similar thereto, and a user's search for a target desired to be searched for can be performed by using the image data of the target.

What is claimed is:

1. A search supporting system comprising:
   a memory that stores instructions; and
   a computer that is configured to execute the instructions stored in the memory to:
   receive an input image,
   extract characteristics information of the input image, the image characteristics information comprising a contour extracted from an image area of a product included in the input image,
   search a first database to acquire first product image data, which has image characteristics information that is the same as or similar to that of the input image, the first product image data corresponding to a first product, search a second database to acquire second product image data corresponding to a second product, which is different from the first product and which can be combined with the first product, combine images of the first product image data and the second product mage data to produce combined image data, and output (a) the first product image data, (b) information on the second product and (c) the combined image data.

2. The search supporting system according to claim 1, wherein the image characteristics information includes at least one of form, color, shape, and texture of the product included in the input image.

3. The search supporting system according to claim 1, wherein the information on the second product includes at least one of second product image data, a name of the second product, a sales store that sells the second product, and a price of the second product.

4. The search supporting system according to claim 1, wherein the first product includes at least one of goods, an electro-chemical product, furniture, a drawing, a building including a store or a company, a plant, an animal, real estate, and a landscape.

5. A method of supporting a search, the method performed by a computer executing instructions stored in a memory and comprising:

receiving an input image;

extracting characteristics information of the input image, the image characteristics information comprising a contour extracted from an image area of a product included in the input image;

searching a first database to acquire first product image data, which has image characteristics information that is the same as or similar to that of the input image, the first product image data corresponding to a first product;

searching a second database to acquire second product image data corresponding to a second product, which is different from the first product and which can be combined with the first product;

combining images of the first product image data and the second product image data to produce combined image data; and outputting (a) the first product image data, (b) information on the second product and (c) the combined image data.

6. A non-transitory computer-readable storage medium that stores a search supporting program that causes a computer to perform the operations of:

receiving an input image;

extracting characteristics information of the input image, the image characteristics information comprising a contour extracted from an image area of a product included in the input image;

searching a first database to acquire first product image data, which has image characteristics information that is the same as or similar to that of the input image, the first product image data corresponding to a first product;

searching a second database to acquire second product image data corresponding to a second product, which is different from the first product and which can be combined with the first product;

combining images of the first product image data and the second product image data to produce combined image data; and outputting (a) the first product image data, (b) information on the second product and (c) the combined image data.

\* \* \* \* \*